US012641488B2

(12) United States Patent
Kim et al.

(10) Patent No.: US 12,641,488 B2
(45) Date of Patent: May 26, 2026

(54) METHOD AND DEVICE FOR PERFORMING SENSING IN WIRELESS LAN SYSTEM

(71) Applicant: LG ELECTRONICS INC., Seoul (KR)

(72) Inventors: Sanggook Kim, Seoul (KR); Jeongki Kim, Seoul (KR); Jinsoo Choi, Seoul (KR); Dongguk Lim, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 333 days.

(21) Appl. No.: 18/279,022

(22) PCT Filed: Mar. 3, 2022

(86) PCT No.: PCT/KR2022/003030
§ 371 (c)(1),
(2) Date: Aug. 25, 2023

(87) PCT Pub. No.: WO2022/186635
PCT Pub. Date: Sep. 9, 2022

(65) Prior Publication Data
US 2024/0137813 A1    Apr. 25, 2024
US 2024/0236769 A9    Jul. 11, 2024

Related U.S. Application Data

(60) Provisional application No. 63/155,757, filed on Mar. 3, 2021.

(51) Int. Cl.
*H04W 28/18*      (2009.01)
*G01S 7/00*       (2006.01)
*H04W 84/12*      (2009.01)

(52) U.S. Cl.
CPC ............. *H04W 28/18* (2013.01); *G01S 7/006* (2013.01); *H04W 84/12* (2013.01)

(58) Field of Classification Search
CPC ..... H04W 28/18; H04W 24/10; H04W 88/02; H04W 84/12; H04W 8/005; H04W 24/08;
(Continued)

(56) References Cited

U.S. PATENT DOCUMENTS 11,617,100 B2 *   3/2023   Beg ......................... H04W 8/24
                                                         370/338
2019/0271774 A1 *   9/2019   Zhang ..................... G01S 13/87
(Continued)

*Primary Examiner* — Asad M Nawaz
*Assistant Examiner* — Michael Wayne Maddox
(74) *Attorney, Agent, or Firm* — LEE, HONG, DEGERMAN, KANG & WAIMEY

(57) ABSTRACT

In a wireless local area network (LAN) system, a sensing session may comprise a first burst and a second burst. A transmitting STA may transmit a sensing negotiation frame to a receiving STA. The transmitting STA may transmit a first sensing polling frame, associated with the sensing participation intention of the receiving STA, to the receiving STA in the first burst. The transmitting STA may receive a first response signal, associated with the first sensing polling frame, from the receiving STA in the first burst. The transmitting STA may transmit a first sensing frame to the receiving STA in the first burst. The transmitting STA may transmit a feedback request signal to the receiving STA in the first burst. The transmitting STA may receive a feedback signal from the receiving STA in the first burst.

4 Claims, 19 Drawing Sheets

(58) Field of Classification Search
CPC ....... H04W 48/16; H04W 76/14; G01S 7/006;
G01S 13/003; G01S 13/87; H01S 13/26
USPC ........................................................ 370/310
See application file for complete search history.

(56) References Cited

U.S. PATENT DOCUMENTS

| | | | | |
|---|---|---|---|---|
| 2021/0314732 A1* | 10/2021 | Chen | .................... | H04W 4/027 |
| 2022/0066018 A1* | 3/2022 | Han | ..................... | G01S 7/0232 |
| 2022/0150962 A1* | 5/2022 | Chen | ................... | H04B 7/0626 |
| 2022/0308194 A1* | 9/2022 | Zhang | .................. | G01S 13/106 |
| 2023/0132850 A1* | 5/2023 | Liu | ....................... | G01S 13/003 |
| | | | | 342/58 |
| 2023/0319877 A1* | 10/2023 | Chitrakar | .......... | H04W 74/0808 |
| | | | | 370/329 |
| 2024/0049135 A1* | 2/2024 | Lim | ..................... | G01S 5/0268 |
| 2024/0049161 A1* | 2/2024 | Katla | ................... | G01S 13/003 |

* cited by examiner

FIG. 1
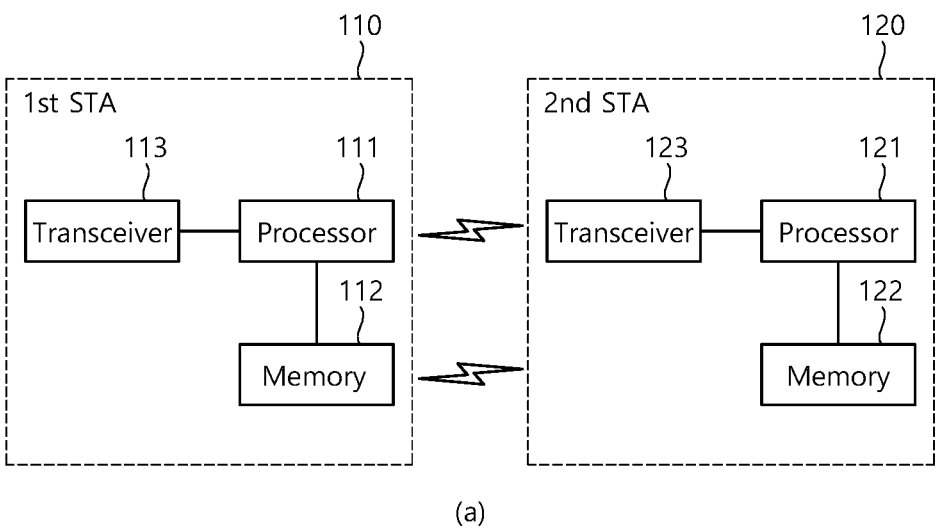
(a)
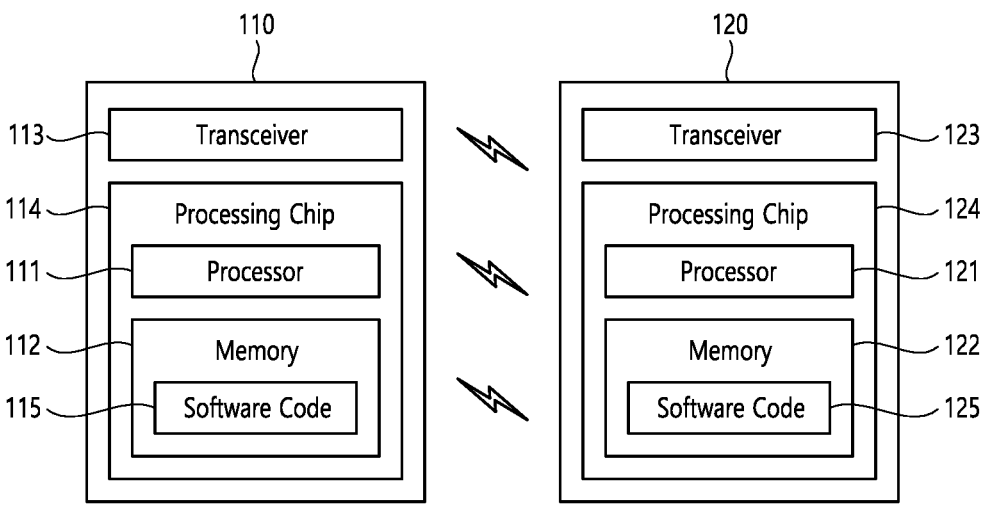
(b)

——▶ : Sensing PPDU transmission

Sensing Initiator
Sensing Transmitter

STA5

STA1     STA2     STA3     STA4

Sensing Responders
Sensing Receivers

⟶ : Sensing PPDU transmission
----► : Sensing feedback transmission

Sensing Initiator
Sensing Transmitter

STA5

STA1     STA2     STA3     STA4

Sensing Responders
Sensing Receivers

——→ : Sensing PPDU transmission

Sensing Responder
Sensing Receiver

STA5

STA1    STA2    STA3    STA4

Sending Initiators
Sensing Transmitters

FIG. 6

Sensing Burst #1
Case 1

· Responses for Trigger frame for sensing polling are assumed
  being transmitted using allocated resources in frequency domain
· Assume that resource allocation in the frequency
  domain is negotiated in Negotiation Phase
· Response may be transmitted using existing frames,
  e.g., ACK frame, CTS-to-self frame, etc · Sensing sounding NDPA is assumed for sensing sounding initiation
· 2 consecutive sounding NDP transmissions are considered

FIG. 15

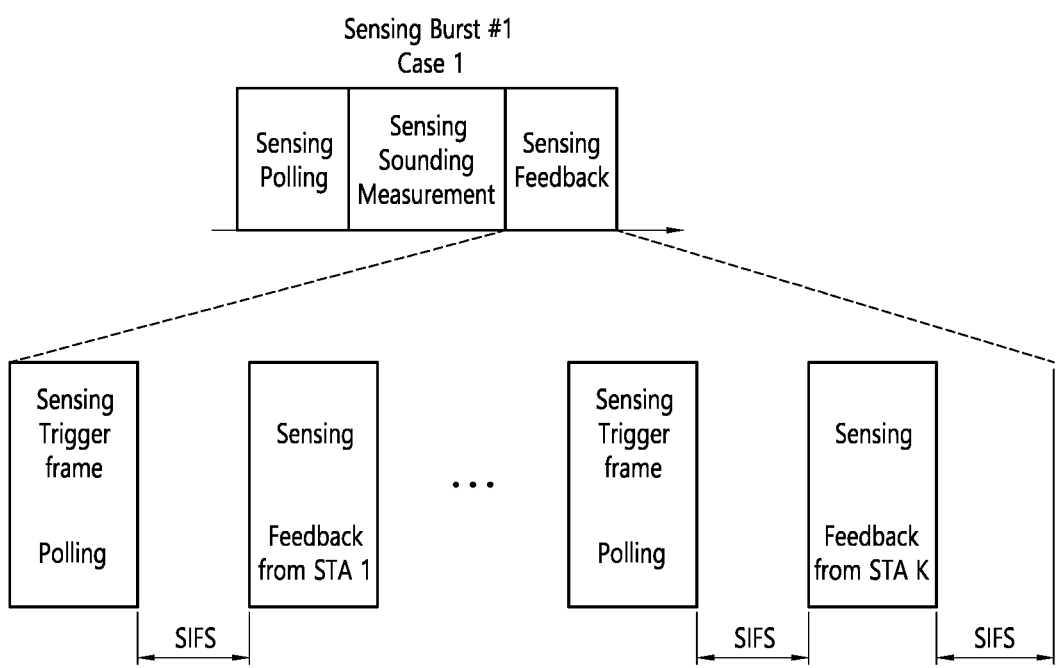

Sensing Burst #1
Case 1

Sensing Polling | Sensing Sounding Measurement | Sensing Feedback

Sensing Trigger frame

Polling

Sensing

Feedback from STA 1

...

Sensing Trigger frame

Polling

Sensing

Feedback from STA K

SIFS

SIFS

SIFS

· Sensing Trigger frame for polling is assumed for sensing feedback
· One polling per feedback is assumed
· One polling for all feedbacks mat be possible if sensing feedback STAs
  know its order in the feedback transmission · Responses for Trigger frame for sensing polling are assumed
  being transmitted using allocated resources in frequency domain
· Assume that resource allocation in the frequency
  domain is negotiated in Negotiation Phase
· Response may be transmitted using existing frames,
  e.g., ACK frame, CTS-to-self frame, etc

FIG. 17

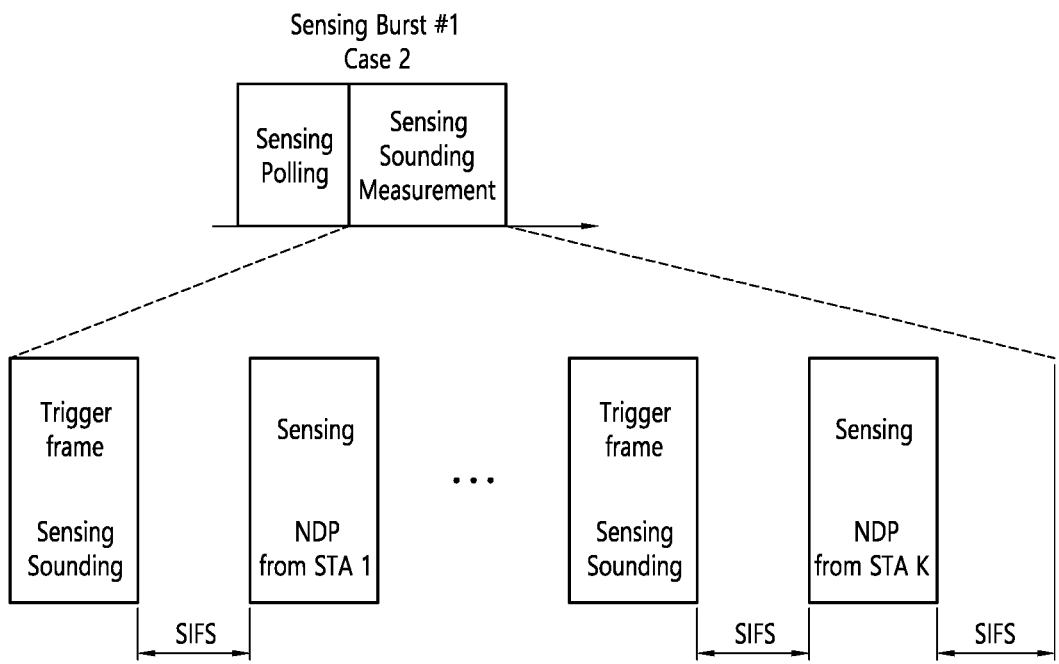

· Trigger frame for sensing sounding is assumed for sensing initiation
· One Trigger frame per STA is assumed
· One Trigger frame for all STA's may be possible if sensing STAs for
  sensing transmission know its order in the sensing transmission
· One polling for all STA's may be possible if sensing STAs for transmission
  are assigned disjoint resources in the frequency or/and spatial domain
  In this case, parallel sensing sounding transmission at the same time
  instance and for thr same duration are possible from multiple STAs

METHOD AND DEVICE FOR PERFORMING SENSING IN WIRELESS LAN SYSTEM

CROSS-REFERENCE TO RELATED APPLICATION(S)

This application is the National Stage filing under 35 U.S.C. 371 of International Application No. PCT/KR2022/003030, filed on Mar. 3, 2022, and also claims the benefit of U.S. Provisional Application No. 63/155,757, filed on Mar. 3, 2021, the contents of which are all incorporated by reference herein in their entirety.

TECHNICAL FIELD

The present disclosure relates to a method and apparatus for performing hybrid sensing in a wireless LAN system.

BACKGROUND

A wireless local area network (WLAN) has been improved in various ways. For example, IEEE 802.11bf WLAN sensing is the first standard which converges communication and radar technologies. Although there is a rapid increase in a demand for unlicensed frequencies in daily life throughout overall industries, due to a limitation in frequencies to be newly provided, it is very preferable to develop the technology of converging the communication and the radar in terms of increasing frequency utilization efficiency. A sensing technology which detects a movement behind a wall by using a WLAN signal or a radar technology which detects an in-vehicle movement by using a frequency modulated continuous wave (FMCW) signal at a 70 GHz band has been conventionally developed, but it may have significant meaning in that sensing performance can be raised up by one step in association with the IEEE 802.11bf standard. In particular, since privacy protection is increasingly emphasized in modern society, a WLAN sensing technology which is legally freer from invasion of privacy is more expected, unlike CCTV.

Meanwhile, an overall radar market throughout automobiles, national defense, industries, daily life, or the like is expected to grow until an average annual growth rate reaches up to a level of about 5% by 2025. In particular, in case of a sensor used in daily life, it is expected to rapidly grow up to a level of 70%. Since the WLAN sensing technology is applicable to a wide range of daily life such as motion detection, breathing monitoring, positioning/tracking, fall detection, in-vehicle infant detection, appearance/proximity recognition, personal identification, body motion recognition, behavior recognition, or the like, it is expected to contribute to enhancing competitiveness of companies. For example, the above examples can be applied to build home security systems and manage patients in hospitals and nursing homes.

SUMMARY

In a wireless local area network system according to various embodiments, a sensing session may include a first burst and a second burst. Typically, a transmitting STA, known as an initiator, may transmit a sensing negotiation frame to a receiving STA. In the first burst, the transmitting STA may transmit to the receiving STA a first sensing polling frame related to the receiving STA's intention to participate in sensing. The transmitting STA may receive a first response signal to the first sensing polling frame from the receiving STA in the first burst. The transmitting STA may transmit a first sensing frame to the receiving STA in the first burst. The transmitting STA may transmit a feedback request signal to the receiving STA in the first burst. The transmitting STA may receive a feedback signal from the receiving STA in the first burst. The STAs participating in sensing in the first burst and the second burst may be the same or different.

Depending on the Channel environment (e.g., the location of the sensing object), certain sensing methods may experience continuous performance degradation. This may result in a case where the requirements of the application to be realized through sensing cannot be satisfied.

According to one example of the present disclosure, in the case of presence detection, if a target is located near a sensing transmitter, the distance between the sensing transmitter and the sensing receiver is greater than a certain value, and a signal containing information about the target arrives weakly at the sensing receiver, sensing by Case 1 may cause performance degradation. In this case, utilizing the method of Case 2 may help to achieve the desired performance.

In one embodiment of the present disclosure, a method is proposed that uses various mixtures of Case 1 and Case 2 methods to reduce the continuous performance degradation expected when using only one method (Case 1, Case 2, or Case 1+Case 2). The ratio of Case 1 to Case 2 methods can also be adjusted in real time as the reliability of the sensing performance is continuously validated.

BRIEF DESCRIPTION OF THE DRAWINGS

FIG. 1 illustrates one example of a transmitter and/or receiver device of the present disclosure.

FIG. 6 is an example of classifying WLAN sensing.

FIG. 15 is a diagram illustrating one embodiment of a sensing operation.

FIG. 17 is a diagram illustrating one embodiment of a sensing operation.

DETAILED DESCRIPTION

Figure 2:
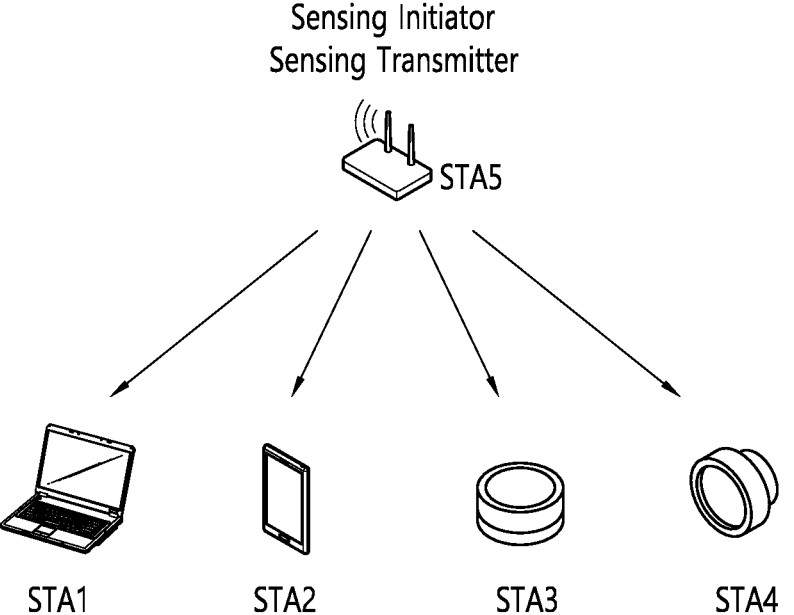
FIG. 2 illustrates an example WLAN sensing scenario using a multi-sensing receiving device.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

Also, as used herein, parentheses may mean "for example". Specifically, where "control information (EHT-Signal)" is indicated, an "EHT-Signal" may be suggested as an example of "control information". In other words, "control information" in the present specification is not limited to EHT-Signal, but EHT-Signal may be suggested as an example of control information. In addition, even when labeled as "control information (i.e., EHT-signal)," an "EHT-signal" may be suggested as an example of "control information.

Technical features described individually in one figure in the present specification may be individually implemented, or may be simultaneously implemented.

Embodiments of the present specification can be applied to a variety of wireless communication systems. For example, embodiments of the present disclosure may be applied to wireless local area network (WLAN) systems. For example, the present disclosure may be applicable to the IEEE 802.11a/g/n/ac standard or the IEEE 802.11ax standard. The present specification may also be applicable to the newly proposed EHT specification or IEEE 802.11be specification. Examples of this specification may also apply to a new wireless LAN specification that enhances the EHT specification or IEEE 802.11be. Examples of the present specification may also apply to mobile communication systems. For example, it can be applied to mobile communication systems based on Long Term Evolution (LTE) and its evolutions based on the 3rd Generation Partnership Project (3GPP) specifications. Further, embodiments of the present specification may be applied to a 5G NR-compliant communication system based on the 3GPP specification and its evolutions.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/ configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122.

The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may mean a link for communication from a non-AP STA to an AP STA, and an uplink PPDU/packet/signal or the like may be transmitted through the uplink. In addition, in the present specification, a downlink may mean a link for communication from the AP STA to the non-AP STA, and a downlink PPDU/packet/signal or the like may be transmitted through the downlink.

A WLAN sensing technology is a sort of radar technologies which can be implemented without a standard, but it is conceived that more powerful performance can be obtained through standardization. The IEEE 802.11bf standard defines an apparatus participating in wireless LAN sensing for each function as shown in the following table. According to the function thereof, the apparatus may be classified into an apparatus initiating WLAN sensing and an apparatus participating in the sensing, an apparatus transmitting a sensing physical layer protocol data unit (PPDU) and an apparatus receiving the PPDU.

TABLE 1

| Terminology | Function |
|---|---|
| Sensing Initiator | apparatus initiating sensing |
| Sensing Responder | apparatus participating in sensing |
| Sensing Transmitter | apparatus transmitting sensing PPDU |
| Sensing Receiver | apparatus receiving sensing PPDU |

Figure 3:
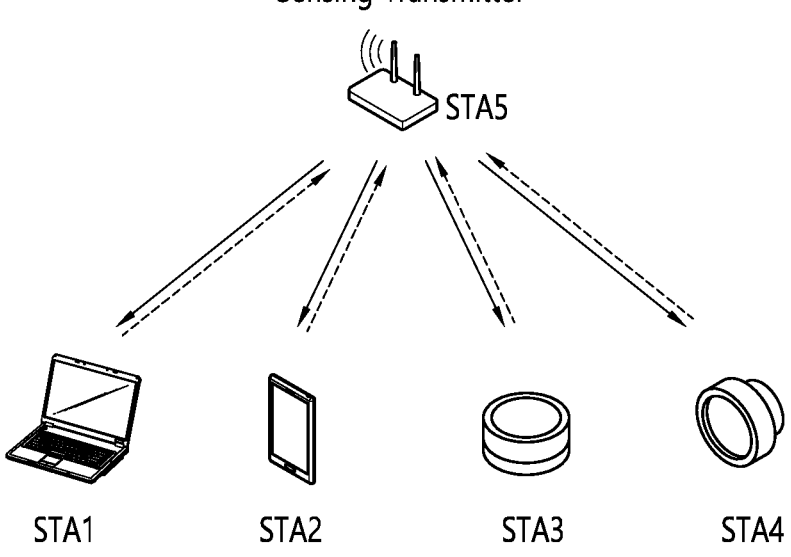
FIG. 3 illustrates an example of a WLAN sensing scenario using a multi-sensing receiving device.
Figure 4:
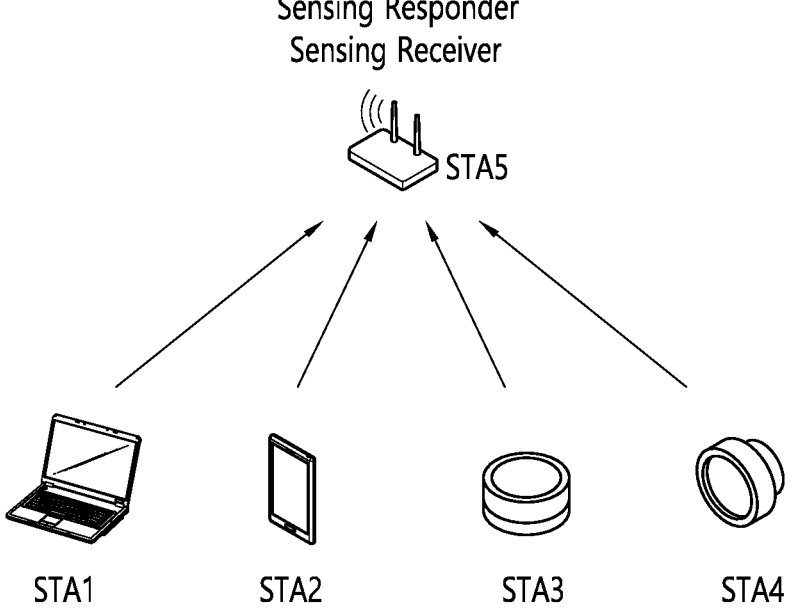
FIG. 4 illustrates an example of a WLAN sensing scenario using a multi-sensing transmitter device.

The present disclosure also defines initiator-based sensing when the subject of signal transmission for WLAN sensing is an initiator, and responder-based sensing when the subject of signal transmission is a responder. FIG. 2 illustrates an example of a wireless LAN sensing scenario using a multi-sensing receiving device. FIG. 3 illustrates an example of a WLAN sensing scenario using multiple sensing receiving devices. The multiple receiving devices in FIG. 3 can communicate information about the channel environment to the transmitting device. FIG. 4 illustrates an example WLAN sensing scenario using multiple sensing transmitting devices.

Figure 5:
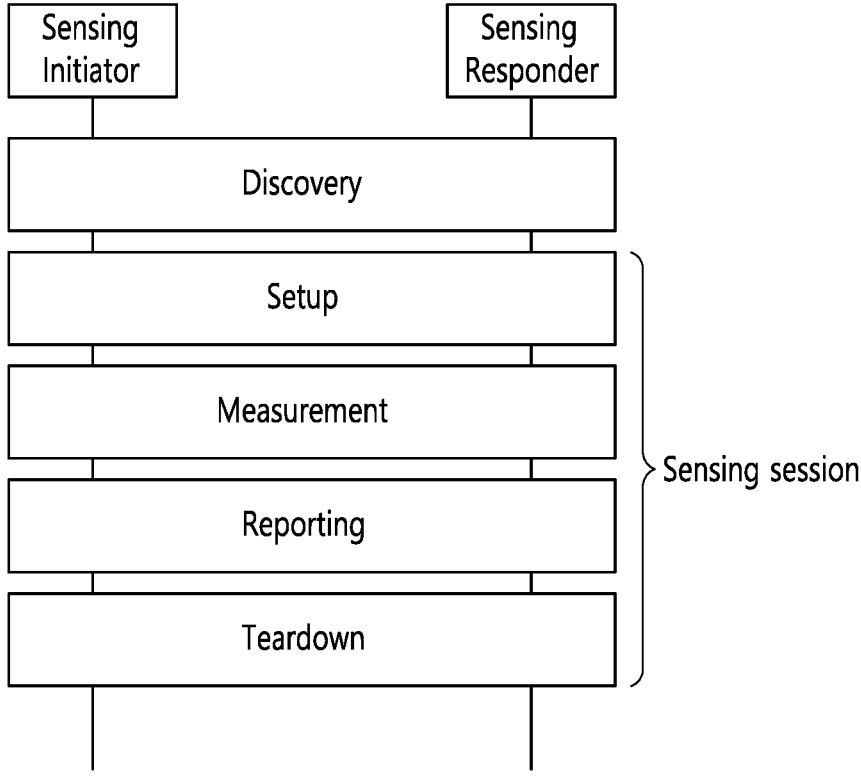
FIG. 5 illustrates an example of a WLAN sensing procedure.
Figure 6:
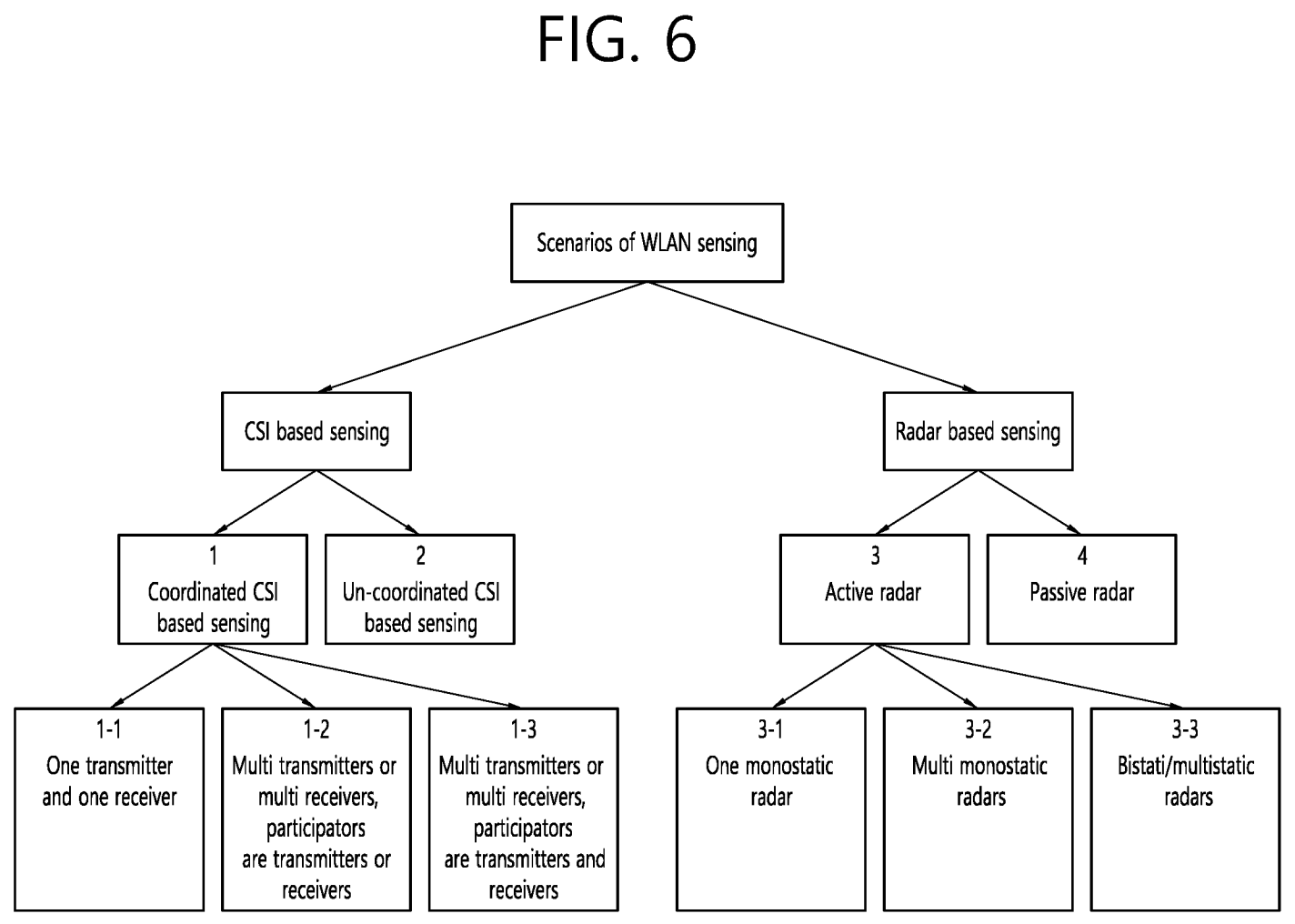

FIGS. 2, 3, and/or 4 illustrate sensing scenarios based on the functionality and placement of WLAN sensing devices. In an environment assuming one sensing initiator and multiple sensing participant devices, FIG. 2 is a scenario utilizing multiple sensing PPDU receiving devices and FIG. 4 is a scenario utilizing multiple sensing PPDU transmitting devices. Assuming that the sensing PPDU receiving device includes a sensing measurement signal processing device, in the case of FIG. 3, a procedure for transmitting (feedback) the sensing measurement results to the sensing initiation device (STA 5) is additionally required. FIG. 5 shows an example of a WLAN sensing procedure. The process of WLAN sensing includes discovery, negotiation, measurement exchange, and tear down between the WLAN sensing initiator and the participating devices. Discovery is the process of identifying the sensing capabilities of WLAN devices, negotiation is the process of determining the sensing parameters between the sensing initiator and the participating devices, measurement exchange is the process of transmitting sensing PPDUs and transmitting sensing measurement results, and tear down is the process of terminating the sensing procedure. FIG. 6 is an example of classifying WLAN sensing. The negotiation can be classified into Session Setup, which determines the devices participating in the sensing and determines the sensing method, and Measurement Setup, which determines the parameter values for measurement in each BURST within the session.

The WLAN sensing may be classified into CSI-based sensing which uses channel state information of a signal arrived at a receiver through a channel and radar-based sensing which uses a signal received after a transmission signal is reflected by an object. In addition, each sensing technology is classified again into a scheme (a coordinated CSI, active radar) in which a sensing transmitter directly participates in a sensing process and a scheme (un-coordinated CSI, passive radar) in which the sensing transmitter does not participate in the sensing process, i.e., there is no dedicated transmitter participating in the sensing process.

Figure 7:
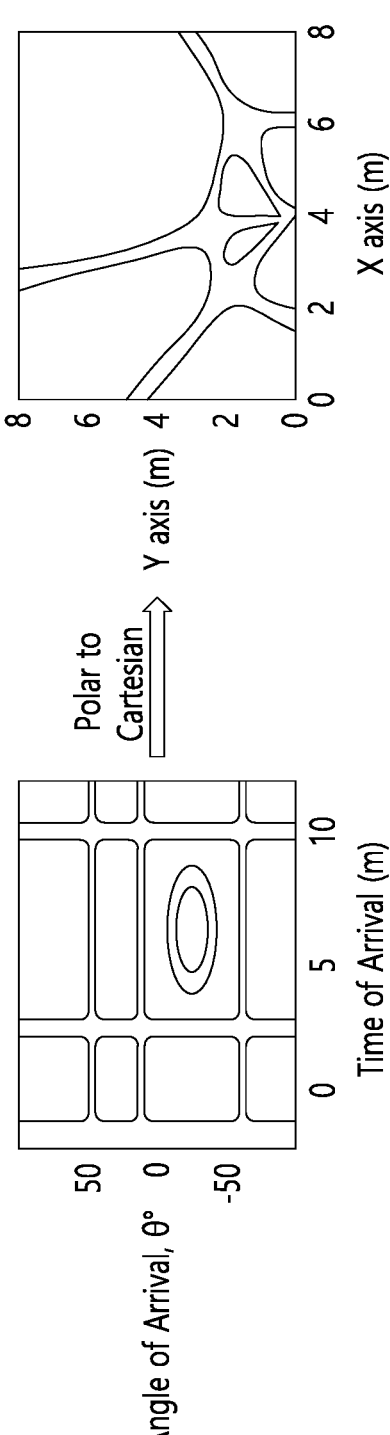
FIG. 7 is an example of indoor positioning using CSI-based wireless LAN sensing.

FIG. 7 illustrates indoor positioning which uses CSI-based WLAN sensing.

In FIG. 7, the CSI-based WLAN sensing is utilized in the indoor positioning. An angle of arrival and a time of arrival are obtained by using CSI, and then are converted into an orthogonal coordinate to obtain indoor positioning information.

Figure 8:
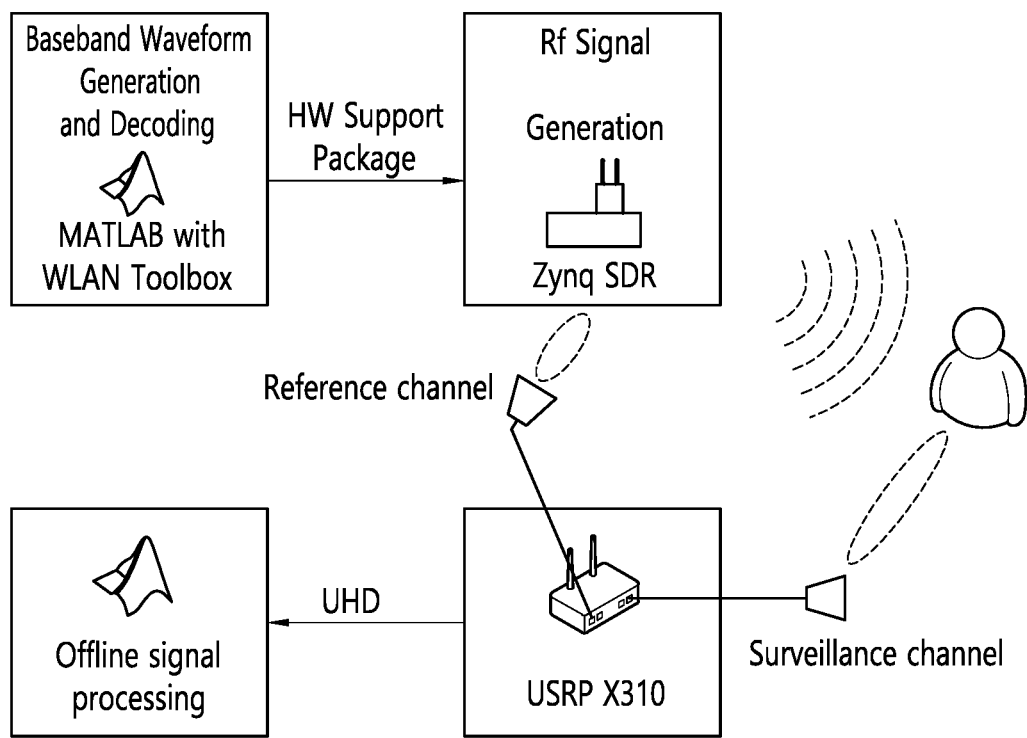
FIG. 8 is an example of an implementation of a wireless LAN sensing device.

FIG. 8 is an example of implementing a WLAN sensing apparatus.

In FIG. 8, the WLAN sensing apparatus is implemented using a MATLAB toolbox, Zynq, and USRP. An IEEE 802.11ax WLAN signal is generated in the MATLAB toolbox, and an RF signal is generated using a Zynq software defined radio (SDR). A signal passing through a channel is received using a USRP SDR, and sensing signal processing is performed in the MATLAB toolbox. Herein, one reference channel (a channel which can be directly received from a sensing transmitter) and one surveillance channel (a channel which can be received by being reflected by an object) are assumed. As a result of analysis using the WLAN sensing apparatus, it is possible to obtain a unique feature capable of identifying a motion or a body action.

The IEEE 802.11bf WLAN sensing standardization is in an initial stage of development at present, and it is expected that a cooperative sensing technology for improving sensing accuracy will be treated to be important in the future. It is expected that a synchronization technology of a sensing signal for cooperative sensing, a CSI management and usage technology, a sensing parameter negotiation and sharing technology, a scheduling technology for CSI generation, or the like will be a core subject for standardization. In addition, it is also expected that a long-distance sensing technology, a low-power sensing technology, a sensing security and privacy protection technology, or the like will be reviewed as a main agenda.

IEEE 802.11bf WLAN sensing is a sort of radar technologies using a WLAN signal which exists anywhere anytime. The following table shows a typical case of using IEEE 802.11bf, which may be utilized in a wide range of daily life such as indoor detection, motion recognition, health care, 3D vision, in-vehicle detection, or the like. Since it is mainly used indoors, an operating range is usually within 10 to 20 meters, and distance accuracy does not exceed up to 2 meters.

TABLE 2

| Name | details | Max range (m) | Key Performance Indicator | Range Accuracy (m) | Max Velocity (m/s)/Velocity Accuracy | angular Accuracy (deg) |
|---|---|---|---|---|---|---|
| Room Sensing | presence detection, counting the number of people in the room | 15 | Number of Persons in Room | 0.5-2 | 2/0.1 | |
| Smart meeting room | presence detection, counting the number of people in the room, localization of active people | 10 | Location of persons in room | 0.5-2 | 1/0.1-0.3 | |
| Motion detection in a room | Detection of motion of in a room (of Human) | 10 | | | | |
| Home security | Detection of presence of intruders in a home | 10 | Detection of a person in a room | 0.5-2 | 3/0.1-0.3 | medium |
| Audio with user tracking | Tracking persons in a room and pointing the sound of an audio system at those people | 6 | Localization of persons to within 0.2 m | 0.2 | 0.5/0.05 | 3 |
| Store Sensing | Counting number of people in a store, their location, speed of movement. Accuracy less important | 20 | Number and location of persons in store | 0.5-2 | 1/0.1-0.3 | 3 |
| Home Appliance Control | Tracking person and motion/gesture detection | 10 | Gesture Detection | <1 | | |
| Gesture recognition - short range (finger movement) | Identification of a gesture from a set of gestures - range <0.5 m | 0.5 | Gesture Detection | | 7 | 3 |
| Gesture recognition - medium range (hand movement) | Identification of a gesture from a set of gestures - range >0.5 m | 2 | Gesture Detection | | | |
| Gesture recognition - large range (full body movement) | Identification of a gesture from a set of gestures - range >2 m | 7 | Gesture Detection | 0.2 | 2/0.1 | 5 |
| Aliveliness detection | Determination whether a close by object is alive or not | 1 | Aliveliness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care - Fall detection | Fall detection - abnormal position detection | 10 | | 0.2 | 3/0.1 | |
| Health case - remote diagnostics | measurements of breathing rate, heart rate etc. | 5 | Breathing rate accuracy/Pulse Accuracy | 0.5 | 2/0.1 | |
| Surveillance/ Monitoring of elder people and/or children | presence detection Tracking person and presence detection | 10 | Detection and localization of person | 0.2-2 | 3/0.1 | |
| Sneeze sensing | Detecting and localizing the target human and sneeze droplet volume | 10 | Detection and localization of person and sneeze droplet volume | 0.2-0.5 | 20/0.1 | |
| 3d vision | building a 3d picture of an environment, using multiple STA | 10 | accuracy of 3d map (range, angle) | 0.01 | 5/0.1 | 2 |
| In car sensing - detection | detection of humans in car | 5 | Presence of Human in car | 0.1 | 1/0.1 | 3 |

In IEEE 802.11, there is ongoing discussion on a technology for sensing a motion or gesture of an object (person or thing) using a Wi-Fi signal of 60 GHz (e.g., 802.11ad or 802.11ay signal). The present specification proposes a method of configuring a frame format used for Wi-Fi sensing and a Wi-Fi sensing sequence. FIG. 8 briefly illustrates a PPDU structure supported in an 802.11ay WLAN system. As shown in FIG. 8, the PPDU format applicable to the 11ay system may include L-STF, L-CEF, L-Header, EDMG-Header-A, EDMG-STF, EDMG-CEF, EDMG-Header-B, Data, and TRN fields, and the aforementioned fields may be selectively included in accordance with the format of the PPDU (e.g., SU PPDU, MU PPDU, etc.). Herein, a portion including the L-STF, L-CEF, and L-header fields may be referred to as a non-EDMG portion, and the remaining portion may be referred to as an EDMG portion. Additionally, the L-STF, L-CEF, L-Header, and EDMG-Header-A fields may be referred to as pre-EDMG modulated fields, and the remaining portions may be referred to as EDMG modulated fields. The EDMG-Header-A field includes information required to demodulate an EDMG PPDU. The definition of the EDMG-Header-A field is the same as those of the EDMG SC mode PPDU and the EDMG OFDM mode PPDU, but is different from the definition of the EDMG control mode PPDU. A structure of EDMG-STF depends on the number of consecutive 2.16 GHz channels through which the EDMG PPDU is transmitted and an index $i_{STS}$ of an $i_{STS}$-th space-time stream. For single space-time stream EDMG PPDU transmission using an EDMG SC mode through one 2.16 GHz channel, an EDMG-STF field does not exist. For EDMG SC transmission, the EDMG-STF field shall be modulated using pi/(2-BPSK).

A (legacy) preamble part of the PPDU may be used for packet detection, automatic gain control (AGC), frequency offset estimation, synchronization, indication of modulation (SC or OFDM) and channel estimation. A format of the preamble may be common to both an OFDM packet and an SC packet. In this case, the preamble may be constructed of a short training field (STF) and a channel estimation (CE) field located after the STF field.

Figure 10:
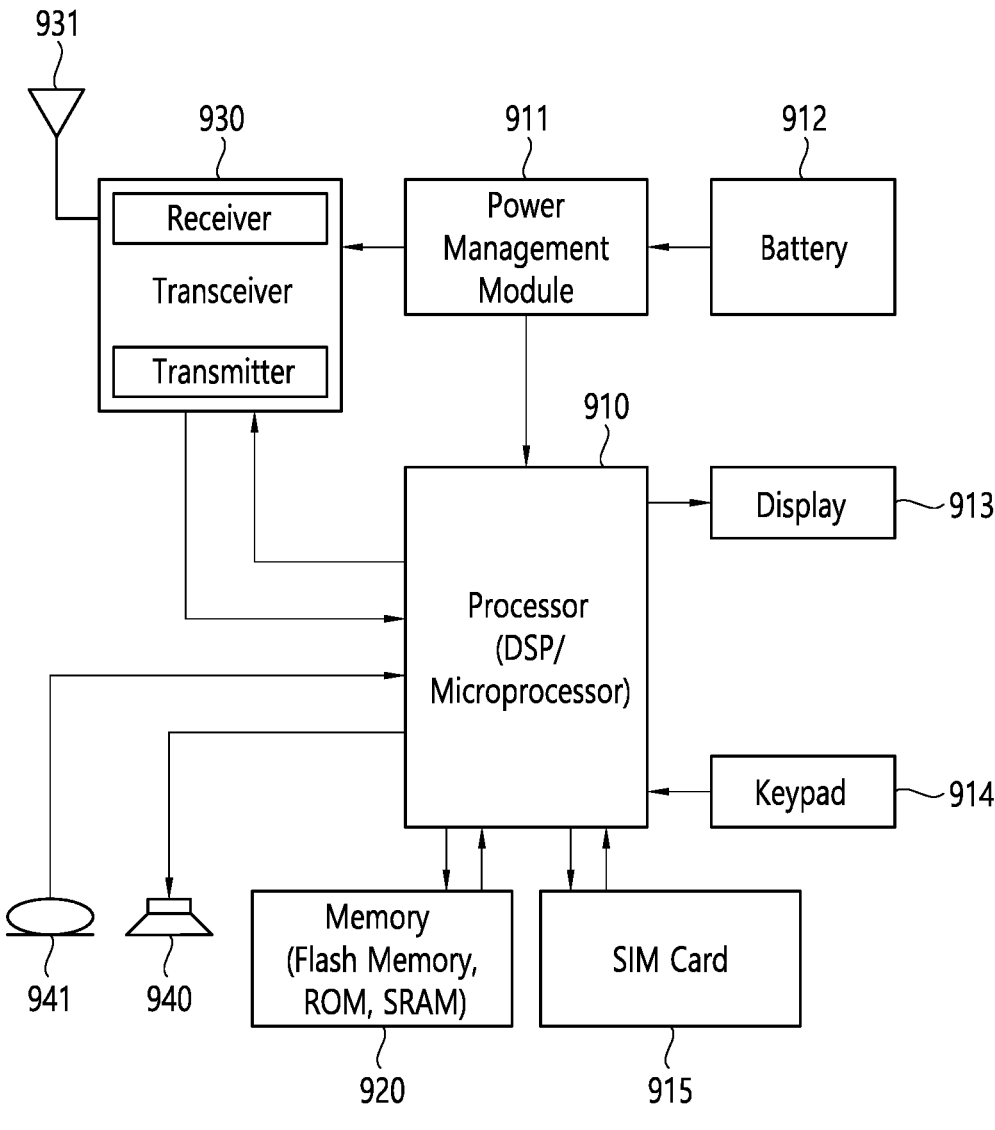
FIG. 10 illustrates an example of a PPDU used herein.

FIG. 10 illustrates an example of a modified transmitting apparatus and/or receiving apparatus of the present specification.

Each apparatus/STA of the sub-figure (a)/(b) of FIG. 1 may be modified as shown in FIG. 10. A transceiver 930 of FIG. 10 may be identical to the transceivers 113 and 123 of FIG. 1. The transceiver 930 of FIG. 10 may include a receiver and a transmitter.

A processor 910 of FIG. 10 may be identical to the processors 111 and 121 of FIG. 1. Alternatively, the processor 910 of FIG. 10 may be identical to the processing chips 114 and 124 of FIG. 1.

A memory 920 of FIG. 10 may be identical to the memories 112 and 122 of FIG. 1. Alternatively, the memory 920 of FIG. 10 may be a separate external memory different from the memories 112 and 122 of FIG. 1.

Referring to FIG. 10, a power management module 911 manages power for the processor 910 and/or the transceiver 930. A battery 912 supplies power to the power management module 911. A display 913 outputs a result processed by the processor 910. A keypad 914 receives inputs to be used by the processor 910. The keypad 914 may be displayed on the display 913. A SIM card 915 may be an integrated circuit which is used to securely store an international mobile subscriber identity (IMSI) and its related key, which are used to identify and authenticate subscribers on mobile telephony apparatuses such as mobile phones and computers.

Referring to FIG. 10, a speaker 940 may output a result related to a sound processed by the processor 910. A microphone 941 may receive an input related to a sound to be used by the processor 910.

In IEEE802.11bf, an 802.11ad and 802.11ay signal transmitting/receiving method which is a 60 GHz Wi-Fi technology is considered to sense a motion or gesture of a STA or person by using a 60 GHz Wi-Fi signal.

Figure 9:
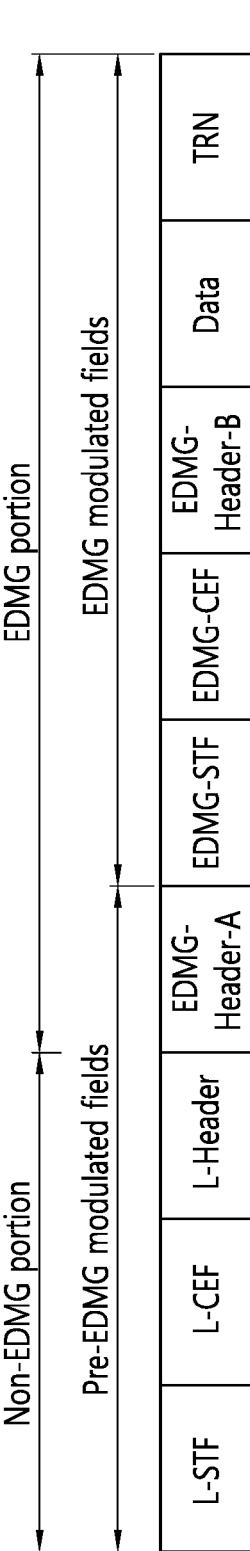
FIG. 9 is a simplified diagram of a PPDU structure supported by an 802.11ay wireless LAN system.

The STA described below may be the apparatus/device of FIGS. 1 and/or 10, and the PPDU may be the PPDU of FIG. 9. The device may be an AP or non-AP STA.

A wireless local area network (WLAN) has been introduced for the purpose of short-distance data transmission using an unlicensed band. An IEEE 802.11 MAC/PHY-based WLAN (e.g. Wi-Fi) has become a representative technology which is at present deployed almost everywhere.

The WLAN (e.g., Wi-Fi) has been designed for data signal transmission, but a usage thereof has recently been extended for other purposes than data transmission.

A WLAN (e.g., Wi-Fi) signal transmitted from a transmitting end and delivered to a receiver may include information on a transmission channel environment between both the transmitter and receiver. WLAN sensing refers to a technology which obtains recognition information for various surrounding environments by processing the transmission channel information obtained through the WLAN signal.

For example, cognitive information may include information obtained through a technology such as gesture recognition, fall detection by elder people, intrusion detection, human motion detection, health monitoring, pet movement detection, or the like.

An additional service may be provided through the recognition information, and WLAN sensing may be applied and used in various forms in daily life. As a method for increasing accuracy of WLAN sensing, devices having at least one WLAN sensing function may be used in the WLAN sensing. The WLAN sensing using the plurality of devices may use multiple pieces of information for a channel environment, and thus may obtain more accurate sensing information, compared to a method of using one device (e.g. a transmitters/receivers). The accuracy of WLAN sensing can be increased when the information you want to get from sensing occurs near the receiver of the sensing signal.

In order to improve the accuracy of sensing in such an environment, the location of the receiver can be dynamically changed so that the specific information to be obtained through sensing can be detected in the vicinity of the receiver.

This specification proposes a method for improving the accuracy of sensing according to a sensing application by variably adjusting a sensing signal transmitter and a sensing information acquisition method within a sensing session.

Sensing Session: This denotes a period of time during which signals for sensing can be transmitted and received. Sensing sessions can be assigned periodically or on demand. A sensing session may comprise of multiple sub-sessions. In this specification, a sub-session may be referred to as a "sensing burst" or a "measurement instance". The bursts comprising a sensing session may be defined contiguously or discretely in time.

WLAN Sensing Initiator: This denotes a station (STA) that uses WLAN signaling to indicate/direct devices with one or more sensing capabilities (i.e., WLAN Sensing responder) to initiate a sensing session. A WLAN Sensing initiator can send signals for sensing (e.g., NDP) or request other STAs to send signals for sensing, i.e., the initiator can be a transmitter or a receiver.

WLAN Sensing Responder: An STA that can participate in WLAN Sensing at the direction/indication of a WLAN Sensing initiator and perform the directed/indicated sensing, deliver the results to the initiator, or transmit signals for sensing at the direction of the initiator.

WLAN Sensing Transmitter: This denotes a STA that transmits signals for WLAN sensing during a sensing session (or burst). When a sensing session is composed of a plurality of sensing bursts, the sensing transmitter may be the same in all bursts, different in some bursts, or different for each burst.

WLAN Sensing Receiver: This denotes a STA that receives signals for WLAN sensing during a sensing session (or burst). When a sensing session is composed of multiple sensing bursts, the sensing receiver can be the same in all bursts, different in some bursts, or different for each burst.

Within a sensing session, the WLAN initiator can play the role of a WLAN sensing transmitter ("initiator-based sensing") or a WLAN sensing receiver ("responder-based sensing").

Within a sensing session, a WLAN responder can play the role of a WLAN sensing transmitter ("responder-based sensing") or a WLAN sensing receiver ("initiator-based sensing").

Sensing Agent: Software or application that can analyze the information obtained through the sensing process and derive results. The entity where the Sensing Agent is located is called the "Central Entity". The Central Entity may be an AP, non-AP STA, or another entity located in the Cloud.

During a sensing burst, sensing signal transmission by the transmitter and feedback transmission by the receiver may occur.

During a sensing burst, only sensing signal transmission by the transmitter may occur. In this case, a burst for feedback can be specified, i.e., feedback can be performed in a specific burst. This can be called "Delayed Feedback".

Sensing measurement by the receiver can be classified in two ways according to the presence or absence of feedback.

Case 1: Sensing signal transmission by the sensing transmitter and feedback of sensing measurement information by the receiver ("Explicit Feedback").

Case 2: The receiver obtains the sensing measurement information by using the sensing signal transmission by the sensing transmitter ("Implicit Feedback").

Sensing bursts can be used in Case 1, Case 2, or a combination of both. A mixed approach may support both Case 1 and Case 2 within a single burst.

This specification describes sensing bursts as supporting either Case 1 or Case 2. An extension of this method may be to use some sensing bursts to support both Case 1 and Case 2. For example, information may be transmitted regarding which bursts support Case 1, Case 2, or Case 1+Case 2.

Figure 11:
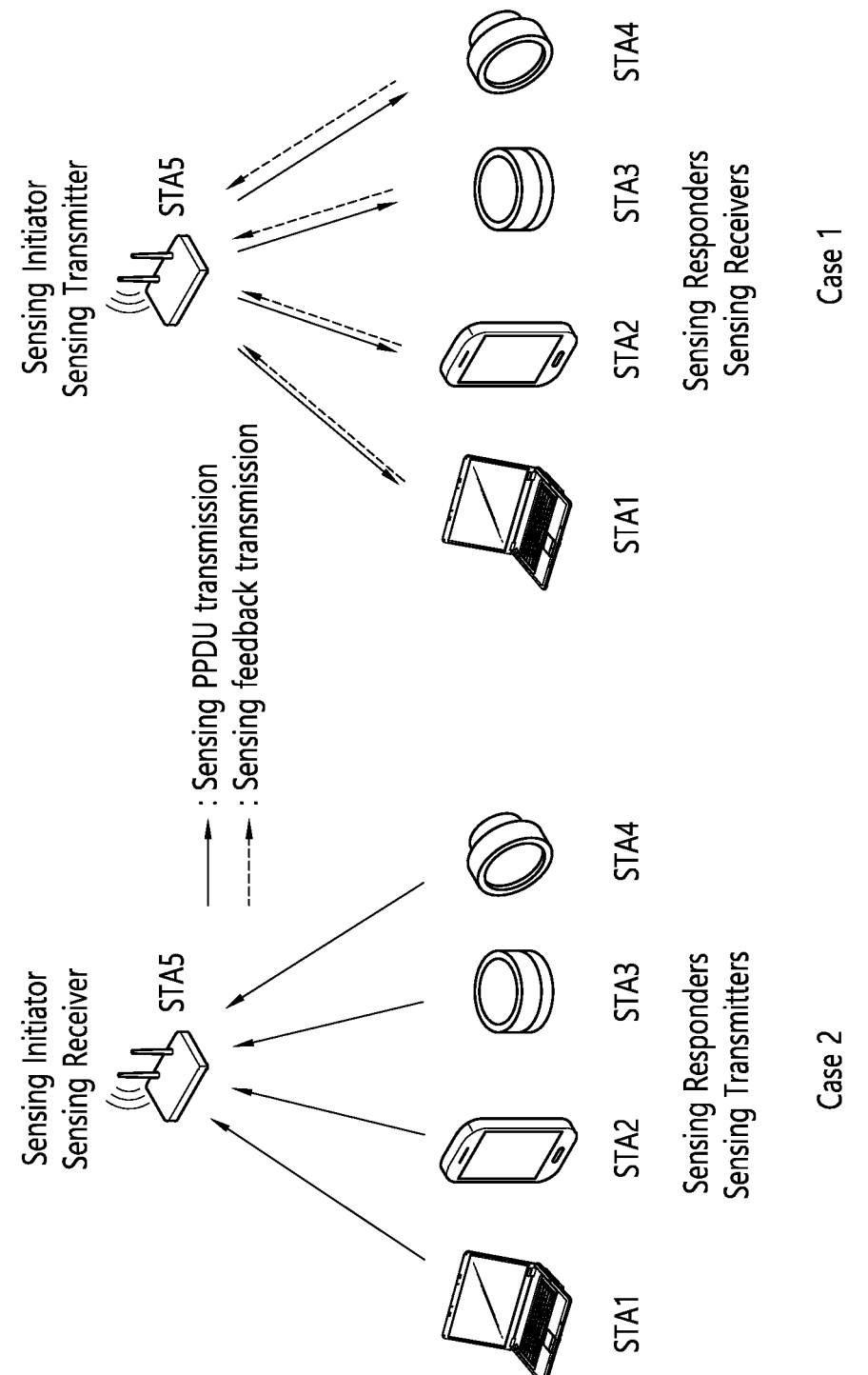
FIG. 11 is a diagram illustrating one embodiment of configuration of STAs in a communication network performing sensing.

FIG. 11 is a diagram illustrating one embodiment of configuration of STAs in a communication network performing sensing.

Referring to FIG. 11, sensing may be performed in different ways in Case 1 and Case 2.

For example, in Case 1, STA5 may act as a sensing initiator and/or a sensing transmitter, and STA1, STA2, STA3, and STA4 may act as a sensing responder and/or a sensing receiver. For example, STA5 may transmit a Sensing PPDU to STA1, STA2, STA3, and STA4, and STA1 through STA4 may receive the Sensing PPDU. STA1 to ST4 may perform WLAN sensing based on the Sensing PPDU, and may transmit Sensing feedback including information derived from the sensing to STA5. STA5 may obtain the information derived from the sensing through the sensing feedback.

For example, in Case 2, STA5 may act as a sensing initiator and/or a sensing receiver, and STA1, STA2, STA3, and STA4 may act as a sensing responder and/or a sensing transmitter. STA1 to STA4 may transmit a Sensing PPDU to STA5, and STA5 may receive the Sensing PPDU. STA5 may perform WLAN sensing based on the Sensing PPDU. Since STA5 can directly perform sensing and derive information related to sensing through the Sensing PPDU, no feedback frame is transmitted in this case.

Negotiation Phase:

Sensing-capable STAs can determine the following information during the Negotiation Phase.

The roles of the sensing initiator and responder

The roles of the sensing initiator and responder may be maintained during the sensing session or may change from sensing burst to sensing burst.

If the sensing session is periodic, information about the period.

Information about when the sensing session starts and ends.

Information about the sensing bursts within the sensing session.

For example, the information of a sensing burst may include a number of sensing bursts defined within a sensing session, a number of signals that may be transmitted within a sensing burst, a duration, a period, a time gap between bursts, and the like.

For example, the time gap between bursts in Case 1 and Case 2 may be different from the time gap between bursts in Case 1 and Case 2.

Within a sensing session comprising one or more bursts, information about whether each burst will operate based on a Case 1 manner or a Case 2 manner.

For example, the Case method information of the burst may be transmitted in the form of an indicator (e.g., a bitmap) for each burst. For example, a position in the bitmap may indicate the burst index, where a value of "0" indicates "Case 1" and a value of "1" indicates Case 2.

For example, the case method information of the burst may be transmitted in the form of a ratio between Case 1 and Case 2. For example, a value of "3 (binary "011")" may indicate three "Case 1" examples followed by one "Case 2" example. In this case, the starting method of the first burst may be determined separately.

For example, the Case method information of the above burst may include information about the operation method for each burst (e.g., "00" means Case 1 method, "01" means Case 2 method, "10" means a mixture of Case 1 and Case 2 within one burst, "11" means "Reserved").

For example, the above information may be passed by the Initiator for each sensing burst.

For example, the above information may be conveyed using a Sensing Trigger frame, a Sensing Announcement frame (e.g., Sensing NDPA), etc.

Information about the "sensing transmitter" in Case 1 and the "sensing receiver" in Case 2 can be determined. In Case 1, STAs that are not designated as sensing transmitters can operate as sensing receivers, and in Case 2, STAs that are not designated as sensing receivers can operate as sensing transmitters.

In the case of Case 1+Case 2, the information of the sensing transmitter can be determined when the sensing starts in Case 1, and the sensing receiver can be determined when the sensing starts in Case 2. Sensing STAs that are not designated as sensing transmitter and receiver can fulfill the roles of sensing receiver and sensing transmitter respectively.

Sensing Stage (Case 1)—Sensing Polling

The sensing stage during each burst may comprise of sensing polling, sensing sounding measurement, and sensing feedback.

Sensing polling can be performed by the sensing initiator or by an STA indicated/directed by the sensing initiator. In this case, the sensing initiator or the STA designated by the sensing initiator may perform the role of a sensing transmitter.

During sensing polling, the sensing transmitter may check/ask the STAs if they want to participate in sensing. For example, an existing Trigger frame may be used for sensing polling. In this case, a subtype field of the Trigger frame can be defined for sensing, or a new frame can be defined for polling.

During sensing polling, the sensing transmitter may check/ask STAs to participate in sensing. For example, the conventional/existing Null Data Packet Announcement (NDPA) frame may be used for sensing polling. In this case, the NDPA may contain an indicator that the purpose of the NDPA is sensing. For example, a traditional Multi-User Request To Send (MU-RTS) frame may be used for sensing polling. In this case, the MU-RTS may contain an indicator that the purpose of the NDPA is sensing.

STAs intended to participate in the polling ("Receivers in Case 1") may communicate this in different frequency bands ("resource unit" in the frequency domain as in 802.11ax) or via spatial streams with the same start and end time. The response to an intention to participate can be accomplished by transmitting an "ACK" frame.

The Inter-Frame Space (IFS) between the polling transmission and the response may be a conventional SIFS, PIFS, etc. or maybe newly defined.

Sensing Stage (Case 1)—Sensing Sounding Measurement

The start of the sensing measurement can be initiated by the transmission of an initiation frame by the transmitter. This initiation frame can be used by using an existing Trigger frame, NDPA frame, etc. or by defining a new frame.

The initiation frame may contain transmission-related parameter information (e.g., MCS, number of spatial streams (if MIMO), TX Power, etc.). It may be omitted if the above transmission-related parameter information is agreed upon in the negotiation phase.

For example, the sensing transmitter may transmit a sounding signal using a wide bandwidth. The sounding signal may be transmitted using an existing NDP (Null Data Packet) or a newly designed frame or packet.

For example, a sensing transmitter may transmit a sounding signal to each STA using a spatial stream. The sounding signal may be transmitted using an existing NDP (Null Data Packet) or a newly designed frame or packet.

For more accurate estimation of the channel environment, one or more NDPs may be transmitted using a given time interval. For example, the time interval between NDPs may be Short Inter-Frame Space (SIFS).

Sensing Stage (Case 1)—Sensing Feedback

Sensing feedback can be requested from each STA by the transmitter. For example, the Sensing transmitter may transmit a feedback request frame to the Sensing receivers. The feedback request frame may contain an existing trigger frame or a new frame.

The information to be fed back may be Full CSI (Channel State Information), Partial CSI, Compressed CSI, RSSI (Received Signal Strength Indicator), or sensing results from channel information processing.

For example, the feedback transmission may be sequential in a time-division fashion.

For example, feedback transmission may be performed simultaneously by STAs using frequency bands and spatial domain.

Sensing Stage (Case 2)—Sensing Polling

The sensing stage during each burst may comprise of sensing polling and sensing measurement.

Sensing polling can be performed by the sensing initiator or by an STA indicated/directed by the sensing initiator. In this case, the sensing initiator or the STA designated by the sensing initiator may perform the role of a sensing transmitter.

For example, the sensing initiator may check/ask the sensing responder STAs for their intention to participate in sensing during sensing polling. A Sensing polling frame may contain an existing Trigger frame. In this case, a subtype field of the Trigger frame can be defined for sensing, or a new frame can be defined for polling.

For example, a sensing initiator can check/ask the sensing responder STAs to participate in sensing during sensing polling. The Sensing polling frame may contain an existing Null Data Packet Announcement (NDPA) frame. In this case, an indicator can be defined in the NDPA to indicate that the purpose of the NDPA is sensing. For example, a traditional Multi-User Request To Send (MU-RTS) frame might be used for sensing polling. In this case, the MU-RTS may contain an indicator that the purpose of the MU-RTS is sensing.

STAs intended to participate in polling ("Transmitters in Case 2") may communicate this in different frequency bands (e.g., "resource unit" in the frequency domain as in 802.11ax) or via spatial streams.

The response to the intention to participate in sensing may be conveyed using an "ACK" frame. The IFS (Inter-Frame Space) between the polling transmission and the response may be an existing SIFS, PIFS, etc. or maybe newly defined.

Sensing State (Case 2)—Sensing Sounding Measurement

Sensing measurement can be initiated with the transmission of an initiation frame by the initiator. The initiation frame may include an existing Trigger frame, NDPA frame, new frame, etc.

The initiation frame may include transmission-related parameter information (e.g., MCS, number of spatial streams (if MIMO), TX Power, etc.). It may be omitted if the above transmission-related parameter information is agreed upon in the negotiation phase.

For example, the sensing transmitters may each transmit a sounding signal using a partitioned wideband width. The sounding signal may be transmitted using an existing NDP (Null Data Packet), or it may be a newly designed frame or packet.

For example, the sensing transmitters may each transmit a sounding signal using a spatial stream. The sounding signal may be transmitted using an existing NDP (Null Data Packet) or a newly designed frame or packet.

For more accurate estimation of the channel environment, one or more NDPs may be transmitted at a given time interval. The time interval between NDPs maybe a short inter-frame space (SIFS).

Case 1+Case 2:

Within a sensing burst, a mixture of Case 1 and Case 2 methods described above may be used.

In this case, the methods described above may be used depending on whether the sensing is initiated in Case 1 or Case 2. For example, when starting with Case 1, the sequence of sensing polling+sensing measurement+sensing feedback+sensing polling+sensing measurement can be followed, i.e., Case 1 can be performed and then Case 2 can be performed.

For example, starting with Case 2, the sequence of sensing polling+sensing measurement+sensing polling+sensing measurement+sensing feedback can be followed, i.e., Case 2 can be followed by Case 1.

Some sequences can be omitted because they are included in other sequences. For example, a single sensing polling may include both Case 1 and Case 2.

Figure 12:
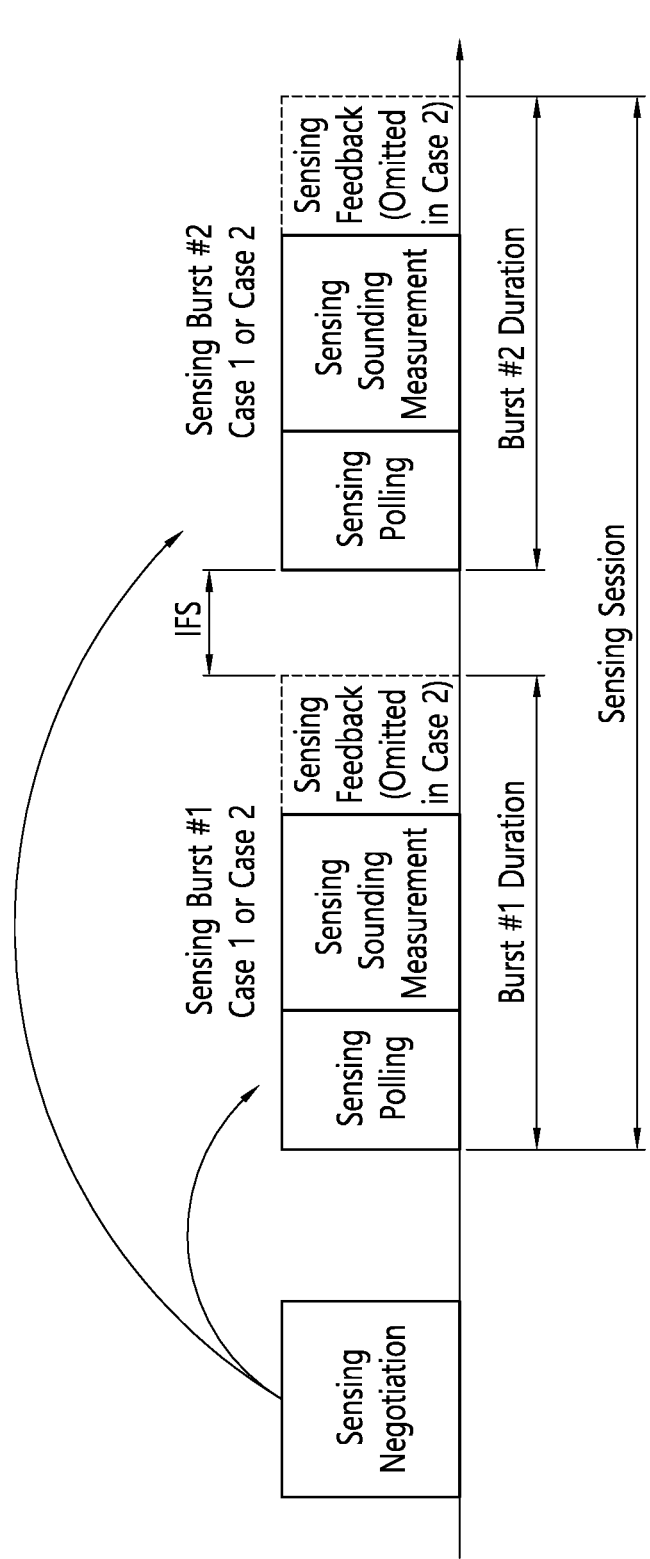
FIG. 12 is a diagram illustrating one embodiment of a sensing operation.

FIG. 12 is a diagram illustrating one embodiment of a sensing operation.

Referring to FIG. 12, the sensing operation may include a sensing negotiation and a sensing session. The sensing negotiation may be followed by a sensing session.

For example, the sensing session may include a first sensing burst (i.e., Sensing Burst #1) and a second sensing burst (i.e., Sensing Burst #2). The first sensing burst can be related to Case 1 or Case 2, and the second sensing burst can also be related to Case 1 or Case 2.

If the sensing burst is related to Case 1, the sensing burst may include Sensing polling, Sensing Sounding Measurement, and Sensing Feedback.

If the sensing burst is related to Case 2, the sensing burst may include Sensing polling, Sensing Sounding Measurement, and Sensing Feedback may be omitted.

Figure 13:
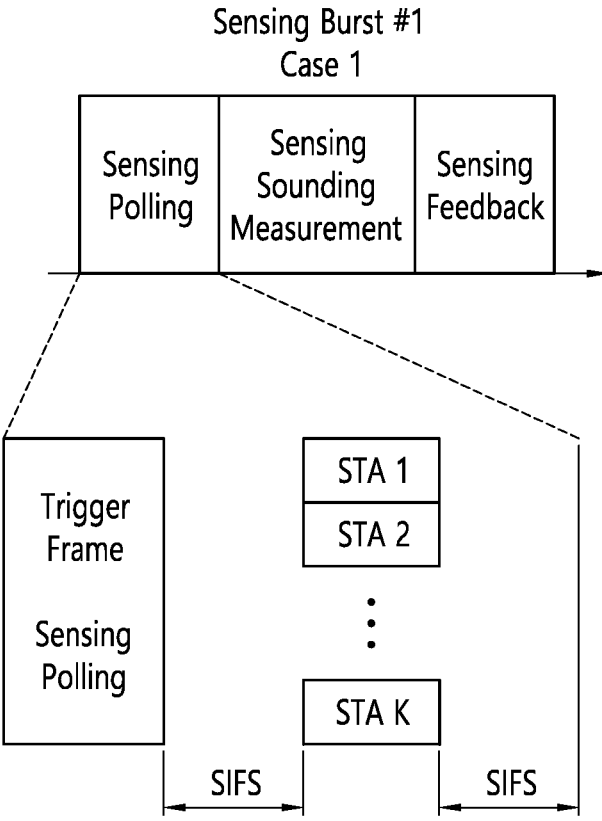
FIG. 13 is a diagram illustrating one embodiment of a sensing operation.

FIG. 13 is a diagram illustrating one embodiment of a sensing operation.

Referring to FIG. 13, a sensing burst may include sensing polling, sensing sounding measurement, and sensing feedback.

In Case 1, the sensing polling may be performed via a trigger frame. For example, the trigger frame may include information that the trigger frame is used for sensing polling. Upon receiving the trigger frame, the STAs may transmit a response to the sensing polling. For example, the existing Multi-User Request To Send (MU-RTS) frame may be used for sensing polling. In this case, the MU-RTS may contain an indicator that the purpose of the MU-RTS is sensing.

For example, responses to sensing polls transmitted by STAs may be transmitted over the frequency resource allocated by the trigger frame. Alternatively, the responses to the sensing polling transmitted by the STAs may be transmitted over the frequency resources allocated during the negotiation phase.

For example, responses to sensing polls transmitted by STAs may be transmitted via conventional ACK frames, CTS-to-self frames, etc.

Figure 14:
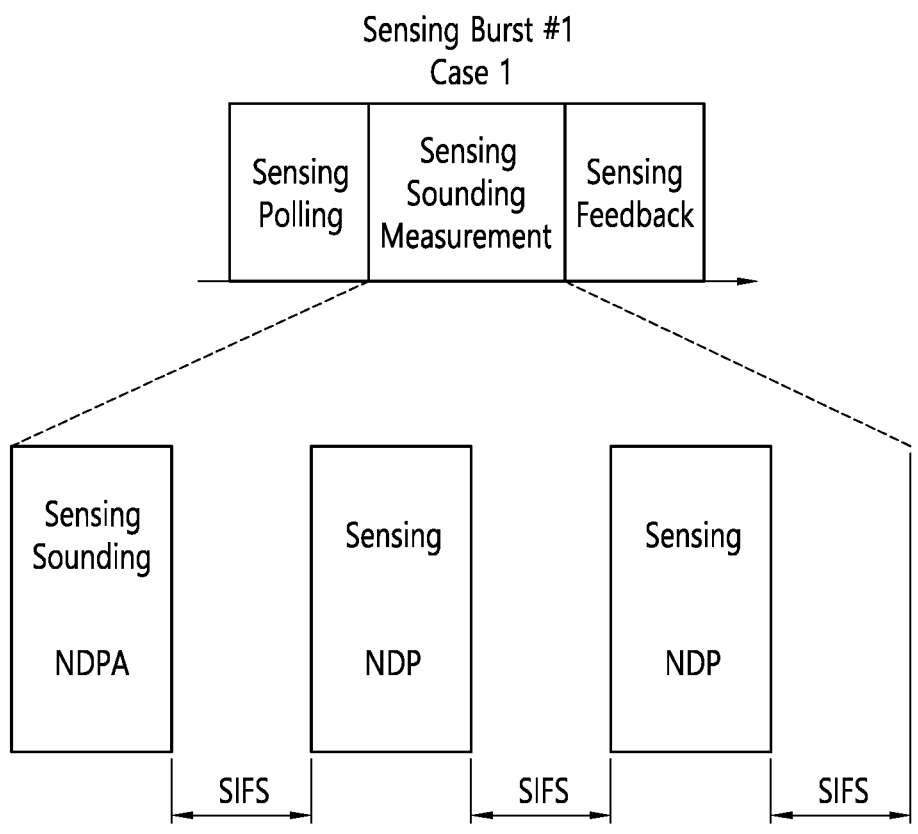
FIG. 14 is a diagram illustrating one embodiment of a sensing operation.

FIG. 14 is a diagram illustrating one embodiment of a sensing operation.

Referring to FIG. 14, a sensing burst may include sensing polling, sensing sounding measurement, and sensing feedback.

Sensing Sounding Measurement may include transmitting a Sensing Sounding NDPA frame (or Sensing Sounding Trigger frame) signaling the initiation of sensing and transmitting at least one Sensing NDP frame.

For example, an NDPA frame may be transmitted to signal the initiation of Sensing Sounding, followed by a SIFS, followed by a Sensing NDP frame, followed by a SIFS, followed by a Sensing NDP frame, and so on.

FIG. 15 is a diagram illustrating one embodiment of a sensing operation.

Referring to FIG. 15, a sensing burst may include sensing polling, sensing sounding measurement, and sensing feedback.

Sensing Feedback may include transmitting a trigger frame requesting feedback and transmitting a sensing feedback frame. For example, the transmission of the trigger frame requesting feedback and the transmission of the feedback frame may be performed sequentially to each sensing responder STA. For example, transmitting the trigger frame to STA1 may cause STA1 to transmit the feedback frame, which may be followed by transmitting the trigger frame to STA2, which may cause STA2 to transmit the feedback frame, which may be followed by transmitting the trigger frame to STA K, which may cause STA K to transmit the feedback frame. For example, the interval between the trigger frame and the feedback frame may be SIFS.

For example, the trigger frame may be transmitted only once, and subsequent feedback frames may be transmitted sequentially by the sensing responder STAs.

Figure 16:
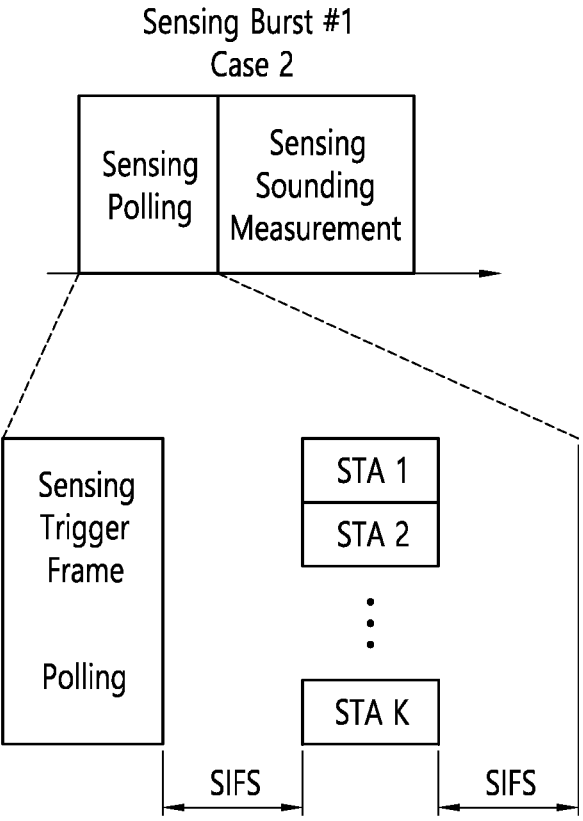
FIG. 16 is a diagram illustrating one embodiment of a sensing operation.

FIG. 16 is a diagram illustrating one embodiment of a sensing operation.

Referring to FIG. 16, a sensing burst may include sensing polling and sensing sounding measurement.

In Case 2, the sensing polling may be performed via a trigger frame. For example, the trigger frame may include information that the trigger frame is used for sensing polling. Upon receiving the trigger frame, the STAs may transmit a response to the sensing polling. For example, the existing Multi-User Request To Send (MU-RTS) frame may be used for sensing polling. In this case, the MU-RTS may include an indicator that the purpose of the MU-RTS is sensing. STAs that receive the MU-RTS frame may transmit a response to the sensing polling.

For example, the response to the sensing polling transmitted by the STAs may be transmitted over the frequency resource allocated by the trigger frame. Alternatively, the responses to the sensing polling transmitted by the STAs may be transmitted over the frequency resources allocated during the negotiation phase.

For example, responses to sensing polls transmitted by STAs may be transmitted via conventional ACK frames, CTS-to-self frames, etc.

FIG. 17 is a diagram illustrating one embodiment of a sensing operation.

Referring to FIG. 17, a sensing burst may include sensing polling and sensing sounding measurement.

The Sensing Sounding Measurement may include the Sensing initiator transmitting a Sensing Sounding NDPA frame or a Trigger frame to each Sensing responder indicating/directing the initiation of the Sensing, and receiving at least one Sensing NDP frame from each Sensing responder.

For example, an NDPA frame or Trigger frame may be transmitted to STA1 signaling the initiation of Sensing Sounding, and after SIFS, STA1 may transmit an NDP frame with a Sensing signal, and again after SIFS, an NDPA frame or Trigger frame may be transmitted to STA2 signaling the initiation of Sensing Sounding, and after SIFS, STA2 may transmit an NDP frame with a Sensing signal, i.e., one Trigger frame may be transmitted to each sensing responder STA.

For example, only one NDPA frame or trigger frame for all sensing responder STAs may be transmitted, and then all sensing responder STAs may transmit NDP frames sequentially. Responder STAs must know in advance the order of transmission of the sensing signals (i.e., NDP frames).

For example, if the sensing responder STAs are allocated different frequency and/or spatial resources, only one NDPA frame or trigger frame for all sensing responder STAs may be transmitted, and then all sensing responder STAs may transmit their sensing signals (i.e., NDP frames) simultaneously.

Depending on the channel environment (e.g., location of the sensing object, etc.), certain sensing methods may experience continuous performance degradation. This can lead to cases where the sensing method cannot satisfy the requirements of the application it is intended to implement. For example, in the case of presence detection, if the target is located near the sensing transmitter, the distance between the sensing transmitter and the sensing receiver is greater than a certain value, and the signal containing information about the target arrives weakly at the sensing receiver, sensing according to Case 1 may cause performance degradation. In this case, using the method in Case 2 can help to achieve the desired performance.

This specification proposes a method for using a mixture of Case 1 and Case 2 methods to reduce the continuous performance degradation expected when using either method (Case 1, Case 2, or Case 1+Case 2). The ratio of Case 1 to Case 2 methods can also be adjusted in real time by continuously validating the reliability of the sensing performance.

Figure 18:
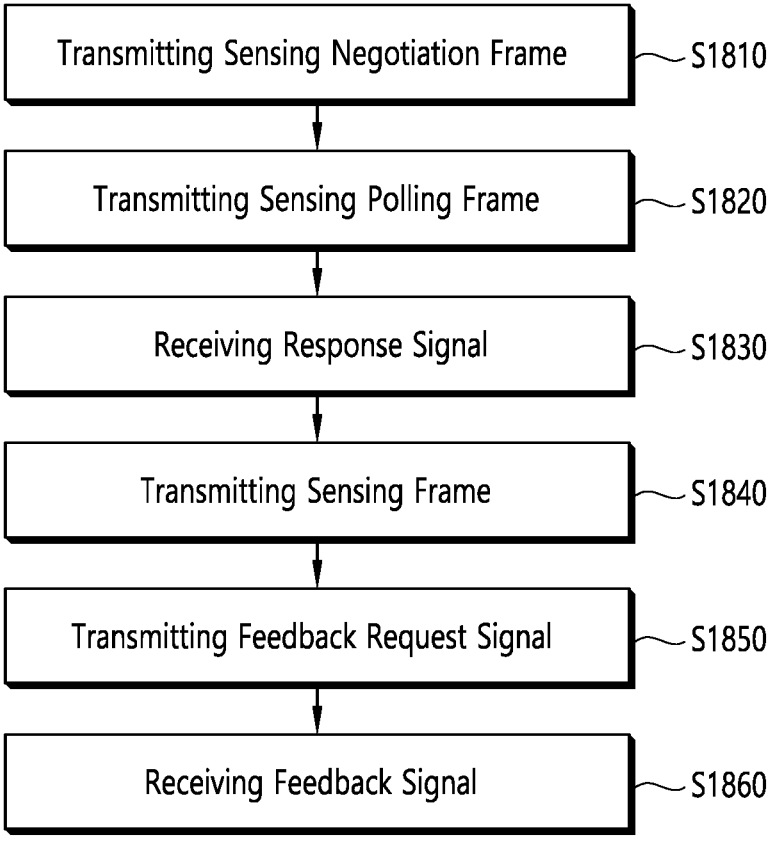
FIG. 18 is a diagram illustrating one embodiment of a transmit STA operation method.

FIG. 18 is a diagram illustrating one embodiment of a transmit STA operation method.

Referring to FIG. 18, the receiving STA operation may be based on the technical features described in at least one of FIGS. 1 to 17.

The transmitting STA may transmit a sensing negotiation frame (S1810). For example, the transmitting STA may transmit a sensing negotiation frame to the receiving STA.

The sensing negotiation frame may include the following information

Roles of the sensing initiator and responder

The roles of the sensing initiator and responder may be maintained during the sensing session or may change between sensing bursts.

If the sensing session is periodic, information about the period.

Information about when the sensing session starts and ends.

Information about the sensing bursts within the sensing session.

For example, the information of a sensing burst may include a number of sensing bursts defined within a sensing session, a number of signals that may be transmitted within a sensing burst, a duration, a period, a time gap between bursts, and the like.

For example, the time gap between bursts in Case 1 and Case 2 may be different from the time gap between bursts in Case 1 and Case 2.

Within a sensing session comprising of one or more bursts, information about whether each burst will operate based on a Case 1 or Case 2.

For example, the case information of the burst may be transmitted in the form of an indicator (e.g., a bitmap) for each burst. For example, a position in the bitmap may indicate the burst index, where a value of "0" indicates "Case 1" and a value of "1" indicates Case 2.

For example, the case method information of the burst may be transmitted in the form of a ratio between Case 1 and Case 2. For example, a value of "3 (binary "011")" may indicate three "Case 1" examples followed by one "Case 2"

example. In this case, the starting method of the first burst may be determined separately.

For example, the Case method information of the above burst may include information about the operation method for each burst (e.g., "00" means Case 1, "01" means Case 2, "10" means a mixture of Case 1 and Case 2 within one burst, "11" means "Reserved").

For example, the above information may be passed by the Initiator for each sensing burst.

For example, the above information may be conveyed using a Sensing Trigger frame, a Sensing Announcement frame (e.g., Sensing NDPA), etc.

Information about the "sensing transmitter" in Case 1 and the "sensing receiver" in Case 2 can be determined. In Case 1, STAs that are not designated as sensing transmitters can operate as sensing receivers, and in Case 2, STAs that are not designated as sensing receivers can operate as sensing transmitters.

In Case 1+Case 2, the information of the sensing transmitter can be determined when the sensing starts in Case 1, and the sensing receiver can be determined when the sensing starts in Case 2. Sensing STAs that are not designated as sensing transmitter and receiver can fulfill the role of sensing receiver and sensing transmitter respectively.

The transmitting STA may transmit a sensing polling frame (S1820). For example, the transmitting STA may transmit to the receiving STA in the first burst a first sensing polling frame relating to the intention of the receiving STA to participate in sensing.

The sensing polling may be performed by the sensing initiator or by an STA indicated/directed by the sensing initiator. In this case, the sensing initiator or the STA designated by the sensing initiator may act as a sensing transmitter.

During sensing polling, the sensing transmitter may ask the STAs if they want to participate in sensing. For example, an existing Trigger frame may be used for sensing polling. In this case, a subtype field of the Trigger frame can be defined for sensing, or a new frame can be defined for polling.

During sensing polling, the sensing transmitter may ask STAs to participate in sensing. For example, the existing Null Data Packet Announcement (NDPA) frame may be used for sensing polling. In this case, the NDPA may include an indicator that the purpose of the NDPA is sensing. For example, a regular/normal MU-RTS (Multi-User Request To Send) frame may be used for sensing polling. In this case, the MU-RTS may contain an indicator that the purpose of the MU-RTS is sensing. STAs that receive the MU-RTS frame may transmit responses to the sensing polling.

STAs intended to participate in the polling ("Receivers in Case 1") may do so in different frequency bands ("resource units" in the frequency domain as in 802.11ax) or in spatial streams with the same start and end time. The response to an intention to participate can be accomplished by transmitting an "ACK" frame.

The Inter-Frame Space (IFS) between the polling transmission and the response may be an existing SIFS, PIFS, etc. or maybe newly defined.

The transmitting STA may receive the response signal (S1830). For example, the transmitting STA may receive a first response signal for the first sensing polling frame from the receiving STA in the first burst.

STAs intended to participate in the polling ("Receivers in Case 1") may communicate their intention to do so in different frequency bands ("resource units" in the frequency domain as in 802.11ax) or spatial streams, with the same start and end time. The response to an intention to participate can be accomplished by transmitting an "ACK" frame.

The Inter-Frame Space (IFS) between the polling transmission and the response may be an existing SIFS, PIFS, etc. or maybe newly defined.

The transmitting STA may transmit a sensing frame (S1840). For example, the transmitting STA may transmit a first sensing frame to the receiving STA in the first burst.

The initiation of the sensing measurement may begin with the transmission of an initiation frame by the transmitter. This initiation frame may be used by utilizing an existing Trigger frame, NDPA frame, etc. or by defining a new frame.

The initiation frame may contain transmission-related parameter information (e.g., MCS, number of spatial streams (if MIMO), TX Power, etc.). It may be omitted if the above transmission-related parameter information is agreed upon in the negotiation phase.

For example, the sensing transmitter may transmit a sounding signal using a wide bandwidth. The sounding signal may be transmitted using an existing NDP (Null Data Packet) or a newly designed frame or packet.

For example, a sensing transmitter may transmit a sounding signal to each STA using a spatial stream. The sounding signal may be transmitted using an existing NDP (Null Data Packet) or a newly designed frame or packet.

For more accurate estimation of the channel environment, one or more NDPs may be transmitted using a given time interval. For example, the time interval between NDPs may be a short inter-frame space (SIFS).

The transmitting STA may transmit a feedback request signal (S1850). For example, the transmitting STA may transmit a feedback request signal to the receiving STA in the first burst.

The sensing feedback may be requested from each STA by the transmitter. For example, the sensing transmitter may transmit a feedback request frame to the sensing receivers. The feedback request frame may contain an existing trigger frame or a new frame.

The transmitting STA may receive the feedback signal (S1860). For example, the transmitting STA may receive a feedback signal from the receiving STA in the first burst.

The information to be fed back can be full CSI (Channel State Information), partial CSI, compressed CSI, RSSI (Received Signal Strength Indicator), or sensing results from channel information processing.

For example, the feedback transmission may be sequential in a time-division fashion.

For example, the feedback transmission may be performed simultaneously by the STAs using a frequency band, a spatial domain.

For example, the transmitting STA may transmit a sensing initiation frame before transmitting the first sensing frame.

For example, the first sensing frame may comprise a null data packet (NDP) frame, and the sensing initiation frame may comprise a null data packet announcement (NDPA) frame.

For example, the sensing initiation frame may further comprise transmission-related parameter information, wherein the transmission-related parameter information may comprise at least one of a modulation and coding scheme (MCS), a number of spatial streams, and a transmission power.

For example, the first sensing frame may comprise at least one null data packet (NDP) frame.

For example, the second burst may comprise: the transmitting STA transmitting to the receiving STA a second sensing poll frame related to the receiving STA's intention to participate in sensing; receiving from the receiving STA a second response signal to the second sensing poll frame; receiving from the receiving STA a second sensing frame; and performing sensing based on the second sensing frame.

For example, the negotiation frame may include information related to whether sensing performed in the first and second bursts is a first method for the transmitting STA to receive feedback from the receiving STA or a second method for the transmitting STA to receive the sensing frame from the receiving STA, respectively.

Figure 19:
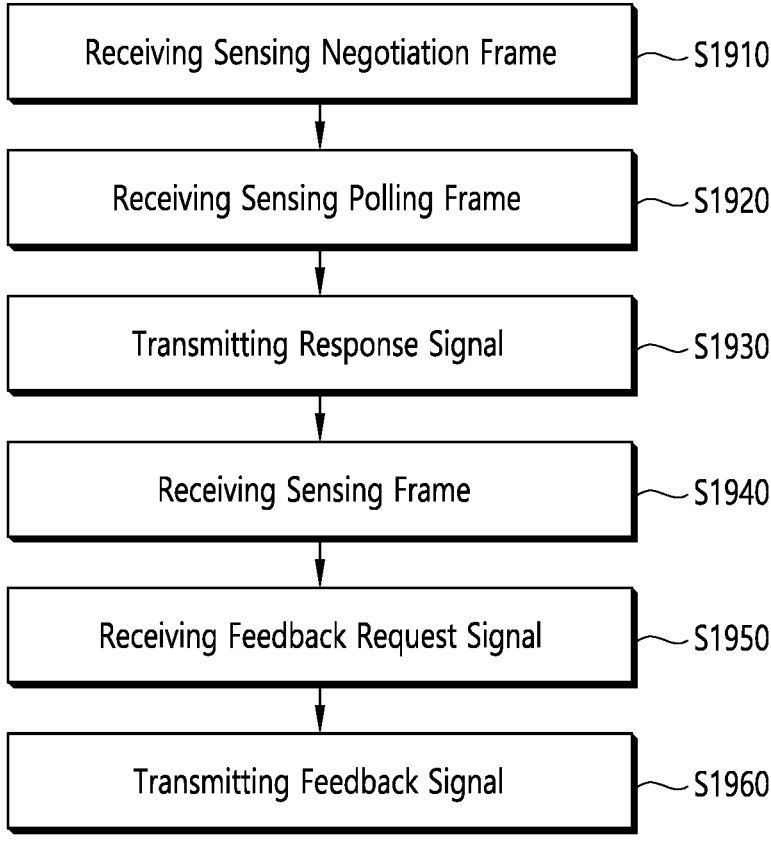
FIG. 19 is a diagram illustrating one embodiment of a receive STA operation method.

FIG. 19 is a diagram illustrating one embodiment of a receiving STA operation method.

Referring to FIG. 19, the receiving STA operation may be based on the technical features described in at least one of FIGS. 1 to 17.

The receiving STA may receive a sensing negotiation frame (S1910). For example, the receiving STA may receive a sensing negotiation frame from the transmitting STA.

The sensing negotiation frame may include the following information

Roles of the sensing initiator and responder

The roles of the sensing initiator and responder may be maintained throughout the sensing session or may change from one sensing burst to another.

If the sensing session is periodic, information about the period.

Information about when the sensing session starts and ends.

Information about the sensing bursts within the sensing session.

For example, the information of a sensing burst may include a number of sensing bursts defined within a sensing session, a number of signals that may be transmitted within a sensing burst, a duration, a period, a time gap between bursts, and the like.

For example, the time gap between bursts in Case 1 and Case 2 may be different from the time gap between bursts in Case 1 and Case 2.

Within a sensing session comprising of one or more bursts, information about whether each burst will operate based on a Case 1 or Case 2 manner.

For example, the case information of the burst may be transmitted in the form of an indicator (e.g., a bitmap) for each burst. For example, a position in the bitmap may indicate the burst index, where a value of "0" indicates "Case 1" and a value of "1" indicates Case 2.

For example, the case method information of the burst may be transmitted in the form of a ratio between Case 1 and Case 2. For example, a value of "3 (binary "011")" may indicate three "Case 1" examples followed by one "Case 2" example. In this case, the starting method of the first burst may be determined separately.

For example, the Case method information of the above burst may include information about the operation method for each burst (e.g., "00" means Case 1, "01" means Case 2, "10" means a mixture of Case 1 and Case 2 within one burst, "11" means "Reserved").

For example, the above information may be passed by the Initiator for each sensing burst.

For example, the above information may be conveyed using a Sensing Trigger frame, a Sensing Announcement frame (e.g., Sensing NDPA), etc.

Information about the "sensing transmitter" in Case 1 and the "sensing receiver" in Case 2 can be determined. In Case 1, STAs that are not designated as sensing transmitters can operate as sensing receivers, and in Case 2, STAs that are not designated as sensing receivers can operate as sensing transmitters.

In the case of Case 1+Case 2, the information of the sensing transmitter can be determined when the sensing starts in Case 1, and the sensing receiver can be determined when the sensing starts in Case 2. Sensing STAs that are not designated as sensing transmitter and receiver can fulfill the role of sensing receiver and sensing transmitter respectively.

The receiving STA may receive the sensing polling frame (S1920). For example, the receiving STA may transmit, in the first burst, a first sensing polling frame from the transmitting STA relating to the receiving STA's intention to participate in sensing.

The sensing polling may be performed by the sensing initiator or by an STA indicated/directed by the sensing initiator. In this case, the sensing initiator or the STA designated by the sensing initiator may act as a sensing transmitter.

During sensing polling, the sensing transmitter may ask the STAs if they want to participate in sensing. For example, an existing Trigger frame may be used for sensing polling. In this case, a subtype field of the Trigger frame can be defined for sensing, or a new frame can be defined for polling.

During sensing polling, the sensing transmitter may ask STAs to participate in sensing. For example, the existing Null Data Packet Announcement (NDPA) frame may be used for sensing polling. In this case, the NDPA may include an indicator that the purpose of the NDPA is sensing. For example, a regular/normal MU-RTS (Multi-User Request To Send) frame may be used for sensing polling. In this case, the MU-RTS may contain an indicator that the purpose of the MU-RTS is sensing. STAs that receive the MU-RTS frame may transmit responses to the sensing polling.

STAs intended to participate in the polling ("Receivers in Case 1") may do so in different frequency bands ("resource units" in the frequency domain as in 802.11ax) or in spatial streams with the same start and end time. The response to an intention to participate can be accomplished by transmitting an "ACK" frame.

The inter-frame space (IFS) between the polling transmission and the response may be an existing SIFS, PIFS, etc. or maybe newly defined.

The receiving STA may transmit a response signal (S1930). For example, the receiving STA may transmit a first response signal for the first sensing polling frame to the transmitting STA in the first burst.

STAs intended to participate in the polling ("Receivers in Case 1") may communicate their intention to do so in different frequency bands ("resource units" in the frequency domain as in 802.11ax) or spatial streams, with the same start and end time. The response to an intention to participate can be accomplished by transmitting an "ACK" frame.

The Inter-Frame Space (IFS) between the polling transmission and the response may be an existing SIFS, PIFS, etc. or maybe newly defined.

The receiving STA may receive the sensing frame (S1940). For example, the receiving STA may receive a first sensing frame from the transmitting STA in the first burst.

The start of a sensing measurement can be initiated by the transmission of an initiation frame by the transmitter. This initiation frame can be used by using existing trigger frames, NDPA frames, etc. or by defining a new frame.

The initiation frame may contain transmission-related parameter information (e.g., MCS, number of spatial streams (if MIMO), TX Power, etc.). It may be omitted if the above transmission-related parameter information is agreed upon in the negotiation phase.

For example, the sensing transmitter may transmit a sounding signal using a wide bandwidth. The sounding signal may be transmitted using an existing NDP (Null Data Packet) or a newly designed frame or packet.

For example, a sensing transmitter may transmit a sounding signal to each STA using a spatial stream. The sounding signal may be transmitted using an existing NDP (Null Data Packet) or a newly designed frame or packet.

For more accurate estimation of the channel environment, one or more NDPs may be transmitted using a given time interval. For example, the time interval between NDPs may be a short inter-frame space (SIFS).

The receiving STA may receive a feedback request signal (S1950). For example, the receiving STA may receive a feedback request signal from the transmitting STA in the first burst.

The sensing feedback may be requested from the respective STAs by the transmitter. For example, the sensing transmitter may transmit a feedback request frame to the sensing receivers. The feedback request frame may contain an existing trigger frame or a new frame.

The receiving STA may transmit a feedback signal (S1960). For example, the receiving STA may transmit a feedback signal to the transmitting STA in the first burst.

The information to be fed back may be full CSI (Channel State Information), partial CSI, compressed CSI, RSSI (Received Signal Strength Indicator), or a sensing output from channel information processing.

For example, the feedback transmission may be sequential in a time-division fashion.

For example, the feedback transmission may be performed simultaneously by the STAs using a frequency band, a spatial domain.

For example, the transmitting STA may transmit a sensing initiation frame before transmitting the first sensing frame.

For example, the first sensing frame may comprise a null data packet (NDP) frame, and the sensing initiation frame may comprise a null data packet announcement (NDPA) frame.

For example, the sensing initiation frame may further comprise transmission-related parameter information, wherein the transmission-related parameter information may comprise at least one of a modulation and coding scheme (MCS), a number of spatial streams, and a transmission power.

For example, the first sensing frame may comprise at least one null data packet (NDP) frame.

For example, the second burst may comprise: the transmitting STA transmitting to the receiving STA a second sensing poll frame related to the receiving STA's intention to participate in sensing; receiving from the receiving STA a second response signal to the second sensing poll frame; receiving from the receiving STA a second sensing frame; and performing sensing based on the second sensing frame.

For example, the negotiation frame may include information related to whether sensing performed in the first and second bursts is a first method for the transmitting STA to receive feedback from the receiving STA or a second method for the transmitting STA to receive the sensing frame from the receiving STA, respectively.

Some of the detailed steps shown in the examples of FIGS. 18 and 19 may not be required and may be omitted. Other steps may be added in addition to the steps illustrated in FIGS. 18 and 19, and the order of the steps may vary. Some of the above steps may have their own technical meaning.

The technical features of the disclosure described above can be applied to a variety of devices and methods. For example, the technical features of the disclosure may be performed/supported by the apparatus of FIG. 1 and/or FIG. 10. For example, the technical features of the disclosure may apply to only a portion of FIGS. 1 and/or 10. For example, the technical features of the disclosure may be implemented based on the processing chips 114, 124 of FIG. 1, or based on the processors 111, 121 and memory 112, 122 of FIG. 1, or based on the processor 910 and memory 920 of FIG. 10. For example, in an apparatus of the present disclosure, the apparatus includes: a memory; and a processor operatively coupled to the memory, the processor: transmitting a sensing negotiation frame to a receiving STA; and, in the first burst, transmitting to the receiving STA a first sensing polling frame associated with the receiving STA's intention to participate in sensing; receiving a first response signal to the first sensing polling frame from the receiving STA in the first burst; transmitting a first sensing frame to the receiving STA in the first burst; transmitting a feedback request signal to the receiving STA in the first burst; and receiving a feedback signal from the receiving STA in the first burst.

The technical features of the present disclosure may be implemented on the basis of a computer readable medium (CRM). For example, a CRM proposed herein is at least one computer readable medium comprising instructions executable by at least one processor of a transmitting STA of a wireless local area network system, wherein the sensing session comprises a first burst and a second burst, transmitting a sensing negotiation frame to a receiving STA; transmitting, in the first burst, a first sensing polling frame to the receiving STA relating to an intention of the receiving STA to participate in sensing; and receiving, in the first burst, a first response signal to the first sensing polling frame from the receiving STA; instructions to perform an operation comprising: transmitting a first sensing frame to the receiving STA in the first burst; transmitting a feedback request signal to the receiving STA in the first burst; and receiving a feedback signal from the receiving STA in the first burst.

The instructions stored within the CRM of the present disclosure may be executed by the at least one processor. The at least one processor associated with a CRM of the present disclosure may be the processors 111, 121 or processing chips 114, 124 of FIG. 1, or the processor 910 of FIG. 10. Meanwhile, the CRM of the present disclosure may be the memory 112, 122 of FIG. 1 or the memory 920 of FIG. 10, or a separate external memory/storage medium/disk, etc.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:

transmitting, by an access point (AP) in a first phase, a sensing polling trigger frame to a plurality of stations (STAs);

receiving, by the AP in the first phase, clear to send to self (CTS-to-self) frames from the plurality of STAs, wherein an interframe space (IFS) between the sensing polling trigger frame and the CTS-to-self frames is a short IFS (SIFS);

transmitting, by the AP in a second phase, a sensing null data packet announcement (NDPA) frame to a first STA related to a sensing measurement report, wherein an IFS between the CTS-to-self frames and the sensing NDPA frame is a SIFS;

transmitting, by the AP in the second phase, a first null data packet (NDP) frame to the first STA, wherein an IFS between the sensing NDPA frame and the first NDP frame is a SIFS, and wherein the sensing measurement report is received by the AP from the first STA;

transmitting, by the AP in a third phase, a sensing sounding trigger frame to a second STA; and receiving, by the AP in the third phase, a second NDP frame from the second STA based on the sensing sounding trigger frame, wherein an IFS between the sensing sounding trigger frame and the second NDP frame is a SIFS.

2. The method of claim 1, wherein the sensing sounding trigger frame is transmitted to a third STA, wherein a third NDP frame is received by the AP from the third STA based on the sensing sounding trigger frame, and wherein the second NDP frame and the third NDP frame are multiplexed in a spatial domain.

3. An access point (AP) in a wireless local area network (WLAN) system, the AP comprising:

at least one processor; and at least one computer memory operatively connected to the at least one processor and storing instructions that, based on being executed by the at least one processor, perform operations comprising:

transmitting, in a first phase, a sensing polling trigger frame to a plurality of stations (STAs);

receiving, in the first phase, clear to send to self (CTS-to-self) frames from the plurality of STAs, wherein an interframe space (IFS) between the sensing polling trigger frame and the CTS-to-self frames is a short IFS (SIFS);

transmitting, in a second phase, a sensing null data packet announcement (NDPA) frame to a first STA related to a sensing measurement report, wherein an IFS between the CTS-to-self frames and the sensing NDPA frame is a SIFS;

transmitting, in the second phase, a first null data packet (NDP) frame to the first STA, wherein an IFS between the sensing NDPA frame and the first NDP frame is a SIFS, and wherein the sensing measurement report is received by the AP from the first STA;

transmitting, in a third phase, a sensing sounding trigger frame to a second STA; and receiving, in the third phase, a second NDP frame from the second STA based on the sensing sounding trigger frame, wherein an IFS between the sensing sounding trigger frame and the second NDP frame is a SIFS.

4. The AP of claim 3, wherein the sensing sounding trigger frame is transmitted to a third STA, wherein a third NDP frame is received by the AP from the third STA based on the sensing sounding trigger frame, and wherein the second NDP frame and the third NDP frame are multiplexed in a spatial domain.

* * * * *